United States Patent [19]

Matulevich

[11] 4,454,455
[45] Jun. 12, 1984

[54] FAULT RESPONSIVE MEANS FOR CHANGING CONTROL SEQUENCE OF A MULTIPLE-BRIDGE ELECTRIC POWER CONVERTER

[75] Inventor: Edward S. Matulevich, Erie, Pa.
[73] Assignee: General Electric Company, Erie, Pa.
[21] Appl. No.: 429,729
[22] Filed: Sep. 30, 1982
[51] Int. Cl.³ .............................................. H02P 13/04
[52] U.S. Cl. ........................................ 318/71; 318/94; 318/317; 318/395
[58] Field of Search ...................... 363/68; 318/71, 72, 318/98, 94, 327, 317, 395, 397

[56] References Cited

U.S. PATENT DOCUMENTS

| | | | |
|---|---|---|---|
| 3,392,319 | 7/1968 | McColl et al. | 363/129 |
| 3,849,718 | 11/1974 | Förster et al. | 363/81 |
| 4,136,305 | 1/1979 | Okumura et al. | 318/376 |
| 4,181,932 | 1/1980 | Fujiwara | 363/68 |
| 4,375,076 | 2/1983 | Magnusson et al. | 363/68 |

Primary Examiner—B. Dobeck
Assistant Examiner—Bentsu Ro
Attorney, Agent, or Firm—Albert S. Richardson, Jr.

[57] ABSTRACT

In the propulsion system of an electric locomotive, a-c wayside power is converted to direct current for the traction motors by means of several phase-controlled rectifying bridges having serially connected outputs. The bridges are controlled sequentially so that their respective output voltages are introduced in stages as increasing amounts of voltage are required at the motors of an accelerating locomotive. Normally certain thresholds of speed need to be attained before the second bridge, and later the third bridge, are permitted to be phased on. Means is provided for changing the bridge control sequence in response to faults in the first or second bridges.

5 Claims, 9 Drawing Figures

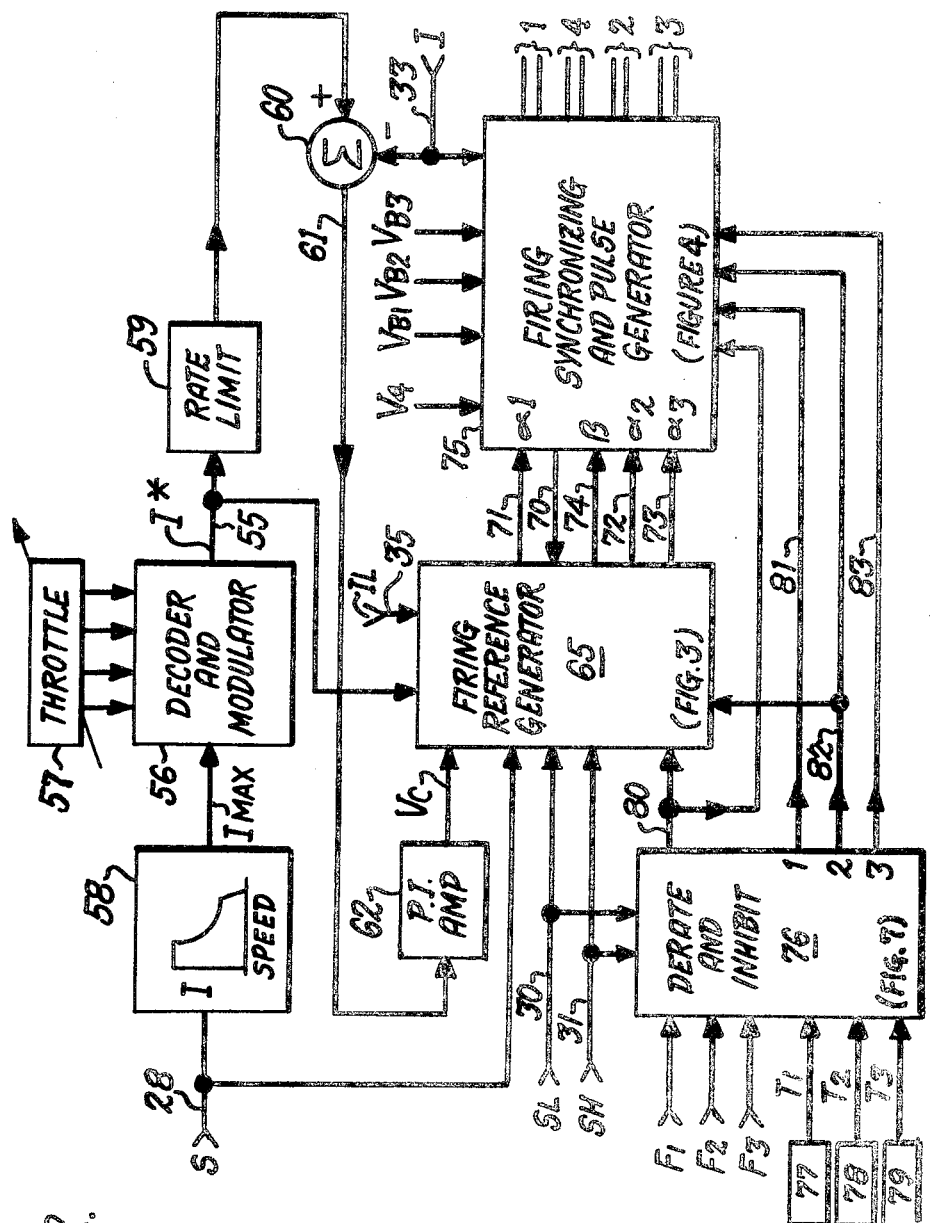

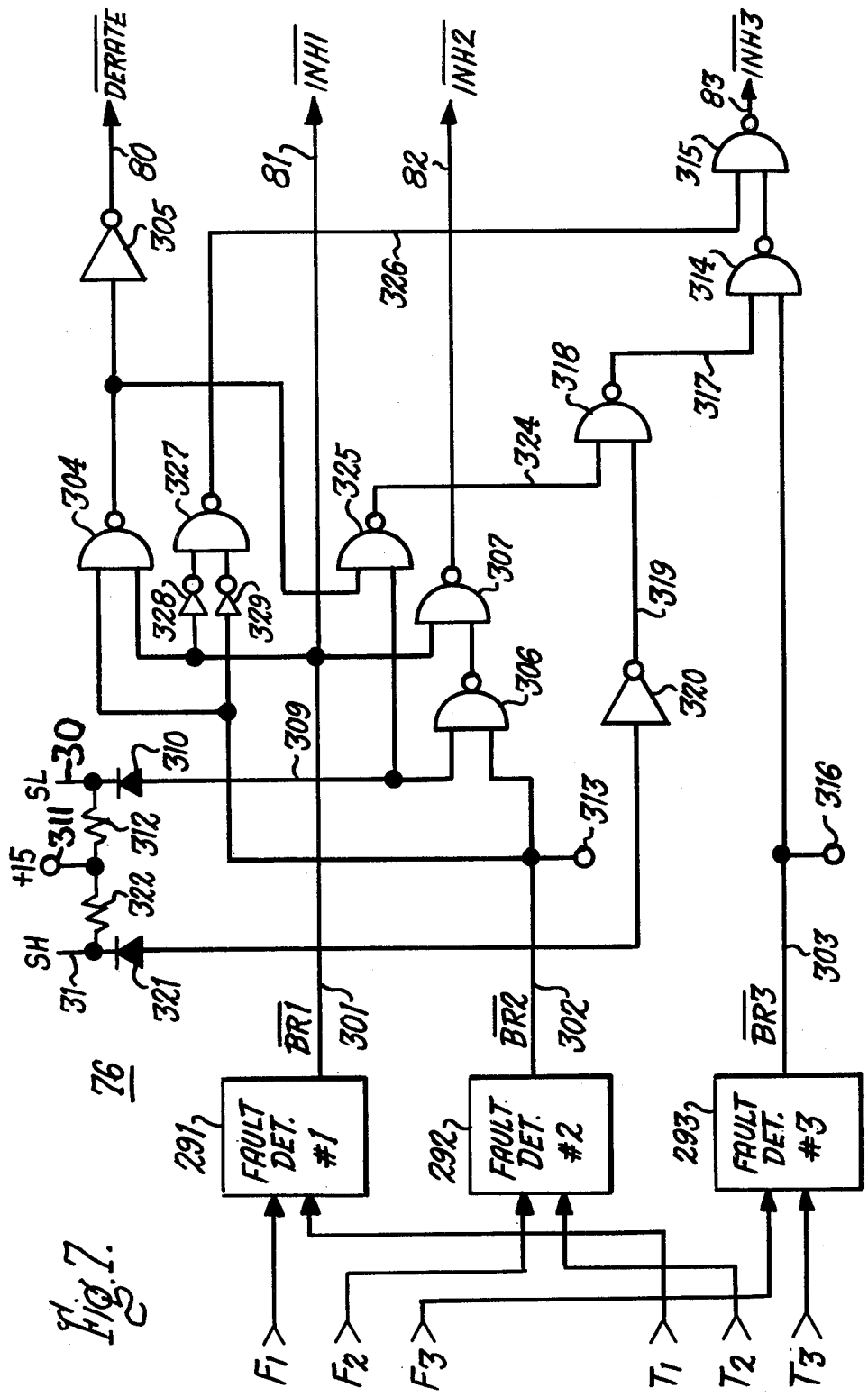

FAULT RESPONSIVE MEANS FOR CHANGING CONTROL SEQUENCE OF A MULTIPLE-BRIDGE ELECTRIC POWER CONVERTER

BACKGROUND OF THE INVENTION

The present invention relates generally to electric power converters, and it relates more particularly to protective features of a multiple-bridge converter well suited to supply direct current (d-c) of variable magnitude to the d-c traction motors on an electric locomotive that is energized from a wayside source of alternating voltage.

Large electrically driven land vehicles such as locomotives and transit cars are propelled by a plurality of traction motors whose rotors are mechanically coupled through speed-reduction gearing to the respective axle-wheel sets of the vehicle. Such motors are usually of the d-c type. If the vehicle is intended to travel along an electrified right of way, it is equipped with a current collector (e.g., a pneumatic or spring-loaded pantograph on the roof of the vehicle) that makes sliding or rolling contact with a bare conductor (e.g., an overhead catenary) extending parallel to the rails or guideway defining the traction vehicle's path of movement. The overhead conductor is part of a power distribution system comprising a source of high-voltage electric power that supplies alternating current (a-c) at a standard frequency such as 60 Hz in the United States or 50 Hz in Europe.

In order to convert the a-c power that is available from the wayside distribution system into direct current of variable magnitude suitable for energizing the armature and field windings of the d-c traction motors on the vehicle, the propulsion system includes a voltage step-down power transformer and a controllable electric power converter. The transformer comprises a single-phase, high-voltage primary winding connected between the current collector and the vehicle wheels (which are at ground potential) and a plurality of lower voltage secondary windings. The converter comprises a plurality of single-phase, full-wave rectifying bridges. Each bridge has two load-current carrying branches or legs connected in parallel with one another between a pair of output terminals which are connected to at least one of the traction motors, and each leg of the bridge comprises at least one pair of serially connected unilaterally conducting electric valves. A transformer secondary winding is connected across the junctures of the respective valve pairs in the two legs of each bridge, thereby applying alternating voltage to the bridge. The bridge is effective to convert the applied alternating voltage to direct voltage at its output terminals.

The valves in at least one leg of each rectifying bridge in the propulsion system of an electric locomotive are usually uncontrolled devices or simple diodes. In order to vary the output voltage of at least one of the bridges, either the other leg of that bridge comprises a pair of serially connected, periodically conducting controllable valves (thereby forming a semi-controlled asymmetrical or "hybrid" rectifying circuit), or the bridge includes an inverse-parallel pair of periodically conducting controllable valves in the a-c connection between the transformer secondary and the juncture of an uncontrolled valve pair. The average magnitude of the output voltage can then be varied as desired by suitably varying, in synchronism with the applied voltage, the "conduction angles" of such controllable valves (i.e., the lengths of their conducting periods, measured in electrical degrees). During intervals when neither of the controllable valves is in a conducting state, there is no current in the associated secondary winding and motor current will coast or "free-wheel" through a diode leg of the rectifying bridge.

For maximum efficiency the controls of the propulsion system on a vehicle such as an electric locomotive are conventionally designed to work the traction motors at substantially constant horsepower throughout a wide speed range of the locomotive. This is usually done by regulating the magnitude of motor current (and hence motor torque) so that it varies inversely with approximately the square root of locomotive speed as the latter varies between a predetermined "corner point" speed and rated maximum speed. But from zero speed to the corner point speed, maximum current is desired in order to provide high tractive force or effort for accelerating the locomotive from rest. In this low speed range, the voltage applied to the armature windings of the traction motors is relatively low because the counter emf of each motor, which is proportional to speed, is relatively low. At maximum speed maximum voltage must be applied to the motors to overcome their high counter emf, while the magnitude of motor current can now be relatively low because the motors draw less current at high speed than at low speed.

To meet the above-reviewed requirements of both low speed and maximum speed propulsion, it has heretofore been common practice to "stage" the rectifying bridges so that initially, as the locomotive is accelerating from rest, the direct voltage applied to a traction motor is provided by a single bridge (which includes controllable valves) and so that later, when the locomotive attains full speed, the motor voltage is the sum of voltages individually contributed by two or more rectifying bridges whose output terminals are interconnected in series. One way to do this is to use three hybrid bridges in series and to control them in sequence so that during the first stage the conduction angle of each controllable valve in a first one of the bridges increases from zero to maximum while motor current passes through the diode legs of the other two bridges, thereby increasing the average magnitude of motor voltage from zero to a level equalling the maximum output voltage of the first bridge, whereas during a second stage the conduction angle of the controllable valves in a second bridge is continuously increased while maintaining a maximum conduction angle in the first bridge, and during a third stage the conduction angle of the valves in the third bridge is similarly increased while maintaining maximum conduction angles in both the first and second bridges, thereby further increasing motor voltage to a higher level which equals the sum of the maximum output voltage of the first bridge and the output voltage of the second bridge during the second stage of operation plus the additional voltage contributed by the third bridge during the third stage.

In the present state of the art, the main load-current carrying electric valves in the controllable leg of the hybrid rectifying bridge are high-power, solid-state controllable switching devices known as thyristors or semiconductor controlled rectifiers (SCRs). A thyristor is typically a three-electrode device having an anode, a cathode, and a control or gate terminal. When its anode and cathode are externally connected in series with an electric power load and a source of forward anode voltage (i.e., anode potential is positive with respect to cathode), a thyristor will ordinarily block appreciable load current until a firing or trigger signal is applied to the control terminal, whereupon it switches from its blocking or "off" state to a conducting or "on" state in which the ohmic value of the anode-to-cathode resistance is very low. The time at which the thyristor is turned on, measured in electrical degrees from a cyclically recurring instant at which its anode voltage becomes positive with respect to its cathode at the start of the appropriate half cycle of alternating voltage applied to the bridge, is known as the "firing angle." The average magnitude of the output voltage of a hybrid bridge can be varied by retarding or advancing the firing angle as desired. This is popularly known as "phase control." Hereinafter the firing angle is sometimes also referred to as the "ignition angle."

Once a thyristor is turned on, it can be turned off only by reducing its current below a given holding level and applying a reverse voltage across the anode and cathode for a time period sufficient to allow the thyristor to regain its forward blocking ability. In a conventional line-voltage commutated phase-controlled hybrid bridge, a conducting thyristor is naturally turned off at the end of each half cycle of the applied voltage, at which time the corresponding diode in the parallel diode leg of the bridge becomes forward biased and current transfers from the thyristor to the diode. Such current transfer is referred to as commutation, and the length of the commutation interval (when both the outgoing or relieved thyristor and the incoming or relieving diode are simultaneously conducting) will depend on the magnitude of current being commutated and the inductance (including the leakage reactance of the transformer secondary winding) in the paths of changing current.

Phase-controlled rectifier operation imposes a lagging power factor load on the a-c source. In other words, when the ignition angle of the thyristor leg in a conventional hybrid bridge is delayed or retarded from a fully advanced condition, the fundamental component of alternating current in the transformer primary winding tends to lag the fundamental component of the source voltage, and the locomotive draws undesired reactive or apparent power in addition to useful real power from the wayside distribution system. This is particularly objectionable when the propulsion system is in a high, constant horsepower mode and the locomotive is traveling through a region of the electrified right of way that is relatively remote from the nearest wayside substation. To reduce the reactive component of power and consequently to improve the power factor of an electric locomotive (i.e., to obtain a power factor that approaches unity), it has heretofore been proposed to provide means for periodically turning off the main thyristor leg of one of the hybrid rectifying bridges prior to the time at which commutation would otherwise naturally occur. For this purpose, turn off means known as a forced commutation circuit can be used. Such means enables the conducting thyristor to be quenched or turned off at any desired "extinction angle." The extinction angle, which is measured in electrical degrees from the cyclically recurring negative-to-positive zero crossing of the anode voltage on the main thyristor, marks the time at which suitable action is initiated to turn off the main thyristor and thereby extinguish its current. By appropriately controlling both the ignition angle and the extinction angle of the thyristors in one bridge, the average magnitude of the net output voltage that is applied to the traction motors can be varied as desired while the fundamental component of transformer primary current is poCsitioned to remain nearly in phase with the fundamental component of primary voltage.

The principle of using forced commutation to obtain unity power factor is further explained in prior art U.S. Pat. No. 3,392,319. Various forced commutation circuits are known, as illustrated, for example, by U.S. Pat. Nos. 3,849,718 and 4,181,932. The ability to control the turn off of the main valves in one of the rectifying bridges of an electric locomotive enables the locomotive to be operated at a desirably high power factor. A high power factor results in lower power losses and less voltage drop, thereby reducing the required size and cost of not only the power transformer on board the locomotive but also the transformers and generators in the wayside electric power system.

In a multiple-bridge sequentially controlled converter of the type summarized above, there is a possibility that one (or more) of the bridges may need service due to a valve failure. If a valve fails to withstand reverse voltage, it will short circuit the a-c input terminals of the associated bridge. In this event, it is desirable to "cut out" the malfunctioning bridge and to permit the converter to operate with a reduced output so that the locomotive can continue traveling to a destination where its propulsion system will be inspected and repaired. But loss of one bridge disrupts the normal bridge control sequence.

SUMMARY OF THE INVENTION

Accordingly, the objective of the present invention is to provide new and improved means for resequencing the controls of a multiple-bridge ac-to-dc converter in the event a fault is detected in any one of the bridges.

In carrying out the invention in one form, the traction motors of an electric locomotive are supplied with direct current by a converter comprising at least first, second, and third separate rectifying bridges whose respective d-c output terminals are serially connected to an electric load circuit that includes at least one of the motors. Each bridge comprises a pair of a-c input terminals and controllable means for interconnecting its input and output terminals. The controllable means include at least one pair of alternately conducting main electric valves, and in the first bridge the main valves have cyclically operative valve turn off means (preferably a forced commutation circuit) respectively associated therewith. In-phase alternating voltages from the secondary windings of a power transformer are respectively applied across the input terminals of the three bridges. A control signal ($V_c$) having a value that varies between first and second limits is provided.

Turn on control means responsive to the control signal is provided (1) for generating a first set of firing signals capable of periodically turning on the main valves in the first bridge at an ignition angle ($\alpha_1$) that varies between maximum retarded and maximum advanced conditions as $V_c$ varies over a first range of values extending from its first limit to a preselected first intermediate value, (2) for generating a second set of firing signals capable of periodically turning on the main valves in the second bridge at an ignition angle ($\alpha_2$) that varies between maximum retarded and maximum advanced conditions as $V_c$ varies over a second range extending from approximately its first intermediate value to a preselected second intermediate value outside of the first range, and (3) for generating a third set of firing signals capable of periodically turning on the main valves in the third bridge at an ignition angle ($\alpha_3$) that decreases from a maximum retarded condition as $V_c$ varies beyond its second intermediate value in a third range of values. In addition, turn off control means is provided for periodically initiating operation of the valve turn off means in the first bridge at a desired extinction angle ($\beta$) which varies within predetermined limits.

Fault detecting means is provided for producing first, second, and third fault signals in the abnormal event of short circuits in the first, second, and third bridges, respectively. In accordance with the present invention, the converter controls include logic means connected to the fault detecting means (1) for inhibiting the first set of firing signals in response to the first fault signal, (2) for inhibiting the second set of firing signals and for making the aforesaid second intermediate value of $V_c$ substantially the same as the first intermediate value in response to the second fault signal, (3) for blocking valve turn off operation of the turn off control means in response to either the first or second fault signal, and (4) for inhibiting the third set of firing signals in response to the third fault signal. In addition, means is provided for preventing $\alpha_3$ from advancing beyond a predetermined minimum angle whenever the logic means is blocking valve turn off operation of the turn off control means.

The invention will be better understood and its various objects and advantages will be more fully appreciated from the following description taken in conjunction with the accompanying drawings.

BRIEF DESCRIPTION OF THE DRAWINGS

FIG. 2 is a functional block diagram of the controls for the rectifying bridges shown in FIG. 1, which controls include the improvement of the present invention for controlling the turn off of the controllable main valves in the first bridge;

FIG. 7 is a schematic diagram of the logic circuits in the "derate and inhibit" block of FIG. 2.

DETAILED DESCRIPTION

Figure 1:
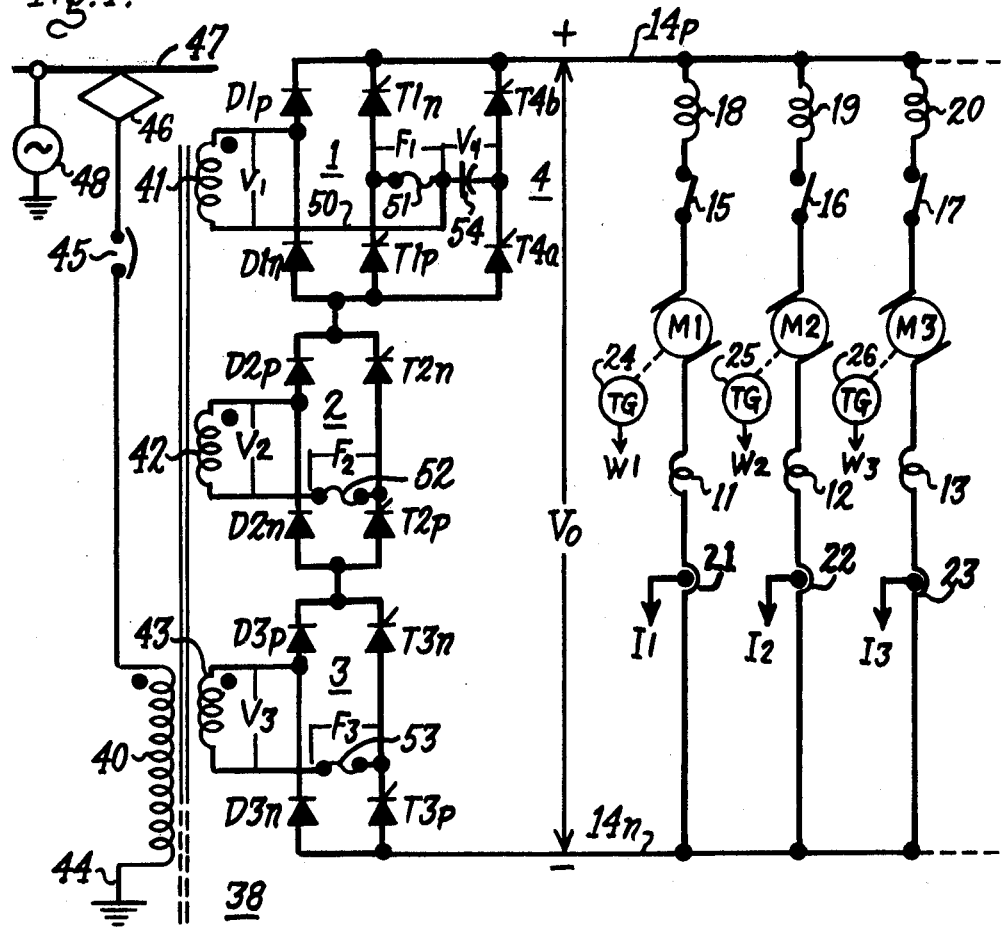
FIG. 1 is a schematic circuit diagram of part of an electric propulsion system on board a vehicle such as an electric locomotive, the illustrated part of the system comprising a single-phase transformer and three serially interconnected hybrid rectifying bridges that convert wayside a-c electric power to d-c power for energizing one group of traction motors on the vehicle, with the first one of the three bridges including controllable turn on and turn off valves.

FIG. 1 depicts an electric propulsion system comprising a group of three d-c traction motors M1, M2, and M3 suitable for propelling or retarding a large traction vehicle such as a locomotive or transit car. Although not shown in the drawings, it will be understood that the rotors of these motors are respectively coupled by speed-reduction gearing to separate axle-wheel sets of one truck of the locomotive. A 3-axle truck has been assumed; only two motors would be used on a 2-axle truck. A second group of three (or two) duplicate motors which are associated with the other truck of the locomotive has been omitted in FIG. 1 for the sake of drawing simplicity.

The motors M1, M2, and M3 are respectively provided with field windings 11, 12, and 13. In the illustrated embodiment of the invention, these field windings are in series with the respective armature windings of the motors whenever the propulsion system is in its motoring mode of operation. The motors are connected in parallel with one another across a pair of relatively positive and negative d-c power conductors 14$p$ and 14$n$, respectively. As is shown in FIG. 1, conventional isolation contactors 15, 16 and 17, current smoothing reactors 18, 19, and 20, and suitable current transducers 21, 22, and 23 are respectively connected in series with the three motors between the d-c conductors. The current transducers 21, 22, and 23 provide signals I1, I2, and I3 proportional to the magnitudes of current in the armatures of the motors M1, M2, and M3, respectively. Three speed sensors 24, 25, and 26 of conventional design are respectively coupled to the rotors of the motors or to the axle-wheel sets of the locomotive truck to provide signals W1, W2, and W3 having frequencies that vary with the angular velocities of the respective motor armatures. Assuming good adhesion between wheels and track, locomotive speed (miles or kilometers per hour) is proportional to motor speed (revolutions per minute). Assuming equal adhesion and equal wheel diameters, the three signals W1, W2, and W3 will have substantially equal values.

Figure 1A:
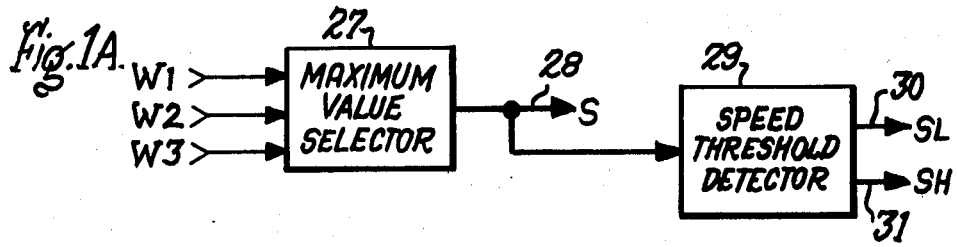
FIGS. 1A and 1B are functional block diagrams of means for providing feedback signals representative of traction motor speed and current, respectively.

As can be seen in FIG. 1A, the signals W1, W2, and W3 from the three speed sensors are fed to a maximum value selector 27 which produces on a line 28 a speed feedback signal S representative of the highest speed of the three motors M1, M2, and M3. The value of S will vary between 0 when the locomotive is at rest and 1.0 per unit when the locomotive is moving at its maxium rated speed (e.g., 75 mph). The speed feedback signal S is supplied to the input of a speed threshold detector 29 which has two output lines 30 and 31. The detector 29 is suitably designed and constructed to produce an output signal SL on the line 30 in response to speed attaining a relatively low threshold (e.g., approximately 0.07 per unit) and to produce an output signal SH on the line 31 in response to speed attaining a predetermined high threshold (e.g., approximately 0.40 per unit). In the illustrated embodiment of the invention, each of the output signals SL and SH is a digital logic signal, i.e., it is low or "0" so long as S has a value indicating that motor speed is lower than the designated threshold, whereas it is high or "1" whenever S indicates motor speed equals or exceeds that threshold.

Figure 1B:
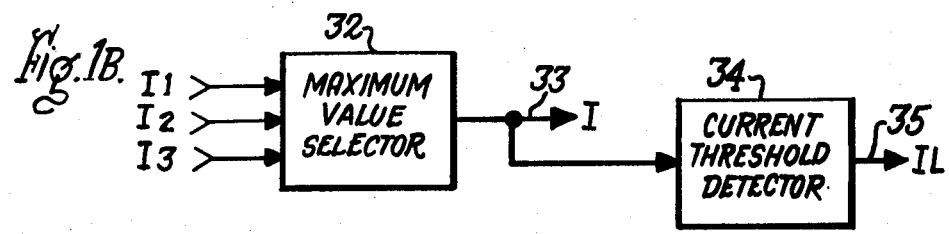

As can be seen in FIG. 1B, the signals I1, I2, and I3 from the three current transducers are fed to a maximum value selector 32 which produces on a line 33 a current feedback signal I representative of the magnitude of direct current in whichever one of the three motors M1, M2, and M3 has the highest current. The current feedback signal I is supplied to the input of a current threshold detector 34 which is suitably designed and constructed to produce an output signal IL on a line 35 in response to the magnitude of motor current attaining a predetermined low level (e.g., 400 amps). The output signal IL is low or "0" so long as I has a value indicating that the magnitude of motor current is lower than such a level, whereas it is high or "1" whenever I indicates motor current equals or exceeds that level.

Returning now to FIG. 1, the d-c power conductors 14p and 14n are coupled to the secondary of a power transformer 38 via an electric power converter comprising three full-wave rectifying circuits 1, 2, and 3. The power transformer has a single-phase primary winding 40 and a plurality of secondary windings, including first, second and third windings 41, 42, and 43, respectively. One terminal of the transformer primary winding 40 is connected to a path 44 at ground potential (e.g., the platform, axles, and wheels of the locomotive and the rails of the track on which the locomotive travels), and the other terminal of winding 40 is connected via the separable main contacts 45 of a power circuit breaker (preferably of the vacuum breaker type) to a suitable current collector 46 on the vehicle (e.g., a pantograph) that maintains sliding contact with an overhead conductor 47 (e.g., a catenary). The catenary 47 is part of a wayside a-c power distribution system that supplies alternating current to the locomotive from a stationary source 48 at substantially constant frequency and relatively high voltage with respect to ground (e.g., 25,000 volts rms at the catenary sections that adjoin wayside power substations). The transformer 38 steps down the source voltage to single-phase alternating voltages V1, V2, and V3 of lower magnitude (e.g., 555 volts rms) on the secondary windings 41, 42, and 43, respectively. These voltages are substantially in phase with one another. While only one set of three secondary windings are shown in FIG. 1, in practice additional secondaries would ordinarily be used.

The three rectifying circuits 1, 2, and 3 shown in FIG. 1 are hybrid or semi-controlled asymmetrical bridges. Each of them has first and second legs connected in parallel with one another between a pair of d-c output terminals. The first leg of each bridge comprises at least one pair of serially connected uncontrolled electric valves D1p and D1n, whereas the second leg comprises at least one pair of serially connected, alternately conducting controllable main electric valves T1n and T1p. All of these valves are polled to conduct current in a direction from the relatively negative to the relatively positive d-c output terminal. In the presently preferred embodiment of the invention, the uncontrolled valves are solid-state power rectifier diodes, and the controllable valves are solid-state controlled rectifiers or thyristors. While each such device has been shown and described in the singular, in practice it can actually comprise a combination of two or more duplicate devices that are interconnected in parallel (to increase the forward current rating of the leg) and/or in series (to increase the reverse voltage rating).

As can be seen in FIG. 1, the three secondary windings 41, 42, and 43 of the power transformer are respectively connected between the juncture of the diodes $D_p$ and $D_n$ in the first legs of the respective bridges and, via current limiting fuses 51, 52, and 53, respectively, the juncture of the thyristors $T_n$ and $T_p$ in the second legs of the respective bridges, whereby in-phase alternating voltages are respectively applied to corresponding a-c input terminals of the three bridges 1, 2, and 3. The d-c terminal pairs of the bridges are connected in series with one another, whereby the output volt $V_o$ of the converter is the sum of the direct voltages at the individual outputs of the respective bridges 1, 2, and 3. This net output voltage is applied to the load circuit comprising the d-c power conductors 14p and 14n, the armature and series field windings of the parallel array of traction motors M1, M2, and M3, and the reactors 18–20 that are in series with the respective motors. By suitably controlling the thyristor legs of the separate bridges, the average magnitude of $V_o$ can be varied as desired.

Each of the three bridges 1, 2, and 3 includes appropriate means for producing a fault signal F1, F2, or F3 in the abnormal event circuit in the bridge. Such means can comprise, for example, a conventional "trigger" mechanism associated with each of the current limiting fuses 51, 52, and 53 for indicating if and when the current interrupting element of the fuse is ruptured by the overcurrent that will flow in the a-c connections of the bridge if either one of the associated pair of main thyristors were shorted (i.e., if a thyristor were to fail to withstand reverse voltage). Alternatively, the overcurrent signal can simply comprise the voltage that will be present across the terminals of the fuse once its interrupting element has blown.

In order to reduce the amount of reactive power that the illustrated propulsion system draws from the wayside source 48 and thereby to increase the power factor of the locomotive, means for controlling the extinction angle of the main thyristors T1p and T1n in the first bridge 1 is desired. For this purpose these thyristors have cyclically operative valve turn off means respectively associated therewith. In the presently preferred embodiment of the invention, the valve turn off means is a forced commutation subcircuit 4 comprising at least one pair of auxiliary controlled rectifiers T4a and T4b connected in circuit with at least one commutating capacitor 54 across the respective main thyristors T1p and T1n in bridge 1. More specifically, the auxiliary rectifiers are serially connected between the negative and positive output terminals of the bridge 1, and the capacitor 54 spans the juncture of these devices and the juncture of the fuse 51 and a line 50 connecting the fuse 51 to the no-dot end of the transformer secondary winding 41. With this arrangement, during a positive half cycle of the applied voltage V1 (i.e., the half cycle during which the dot end of the secondary winding 41 is positive with respect to the line 50), the main thyristor T1p can be forced to turn off by turning on its complementary auxiliary rectifier T4a, and during a negative half cycle of V1 the main thyristor T1n can be forced to turn off by turning on its complementary auxiliary rectifier T4b. While there are a variety of different forced commutation circuits that are suitable for turning off the main thrysitors in the first bridge, the particular subcircuit 4 that is shown in FIG. 1 is preferred because it is relatively simple and inexpensive. Suitable means (not shown) is provided for precharging the commutating capacitor 54 so that prior to any phase control operation of the rectifying bridge 1 the capacitor voltage V4 has sufficient magnitude for successful commutation.

The operation of the bridge 1 will now be briefly summarized for a typical half cycle during which both ignition and extinction angles of the thyristor leg are controlled. Assume that the commutating capacitor 54 is charged so that the electric potential at the juncture of the rectifiers T4a and T4b is negative with respect to the line 50, and also assume that appreciable load current is flowing through the parallel array of traction motors M1, M2, and M3. At the beginning of a positive half cycle of transformer secondary voltage V1, load current will freewheel through the diode leg D1n, D1p of the bridge 1, there is negligible voltage across the d-c output terminals of this bridge, and V1 is applied as a forward anode-to-cathode bias across the main thyristor T1p which withstands this voltage until its control electrode or gate receives a firing signal at the desired ignition angle. The firing signal turns on T1p, whereupon load current is commutated from diode D1n to thyristor T1p. The rate at which current increases in T1p and decreases in D1n depends on the leakage reactance of the transformer secondary winding 41 and the amount of any other inductance in series with these devices. (While not shown in FIG. 1, it is conventional practice to provide a commutating inductor between the juncture of the main thyristors and the line 50.) During the interval when both D1n and T1p are simultaneously conducting, known as the commutation interval, the voltage applied to the bridge collapses. However, as soon as the diode D1n stops conducting, the voltage on the output terminals of the bridge 1 rises to a magnitude equal to the instantaneous magnitude of the transformer secondary voltage V1, and the output voltage will then remain equal to V1 throughout the remainder of the conduction angle of the thyristor T1p.

Subsequently, at the desired extinction angle, the auxiliary rectifier T4a is turned on and load current will be commutated from T1p to T4a. The current now flowing in T4a initially discharges the commutating capacitor 54 and then recharges it with opposite polarity. The rate of change of capacitor voltage V4 depends on the magnitude of load current. During the capacitor discharging interval, the main thyristor T1p has its current reduced to zero and is then temporarily reverse biased by V4. The period between the time at which forward current in T1p decays to zero and the time at which the capacitor is fully discharged (V4 is zero) is known as the circuit turn off interval, and during this interval T1p regains its forward blocking ability. After the turn off interval, the commutating capacitor recharges and its voltage V4 soon rises to a magnitude exceeding the instantaneous magnitude of V1, whereupon the difference between V4 and V1 forward biases the diode D1n. As a result, load current now quickly commutates from the auxiliary rectifier T4a to the diode D1n, and the capacitor 54 is left with a charge of proper polarity and sufficient magnitude for subsequently forcing the other main thyristor T1n to turn off when its complementary auxiliary rectifier T4b is fired at the desired extinction angle during the succeeding negative half cycle of alternating voltage V1. When T4a turns off, V1 is reapplied to the now turned off main thyristor T1p, and load current again freewheels through the diode leg D1n, D1p of the bridge 1 until the other main thyristor T1n is subsequently turned on, at the desired ignition angle, during the negative half cycle of V1.

FIG. 2 depicts the controls that provide properly timed firing signals for the gates of the main thyristors in the three rectifying bridges 1, 2, and 3, respectively, and for the gates of the auxiliary controlled rectifiers in the forced commutation subcircuit 4 of the first bridge 1. A conventional closed loop control system is employed, whereby motor current (and hence tractive effort) is regulated to correspond to a desired magnitude. The desired current magnitude is represented by a current call signal I* which is produced on the output line 55 of a block 56 labeled "decoder and modulator." Inputs to this block are provided by an operator controlled throttle 57 and by a motor speed responsive reference generator 58. The reference generator 58 in turn is connected to the speed feedback signal S on line 28. It is suitably constructed and arranged to supply the decoder and modulator 56 with a maximum current signal having a value which varies as a function of motor speed in the manner indicated by the graph drawn inside the block 58. For any motor speed between zero and a predetermined corner point speed (e.g., nearly 30% of the rated maximum motor speed), the maximum current signal has a constant, relatively high value that results in the propulsion system exerting a relatively high tractive effort, but from corner point speed to maximum speed the value of this signal will decrease with the square root of increasing motor speed so that the horsepower of the propulsion system is high and substantially constant.

The value of the maximum current signal is modulated, according to the given setting of the locomotive throttle 57, by the decoder and modulator 56. The handle of the throttle 57 conventionally has an idle position and eight other discrete positions or power notches, and the particular position that the operator has selected is indicated by a system of relays whose contact positions are decoded in the block 56. The throttle setting is herein referred to as a command signal. At any given motor speed, the value of the current call signal I* on line 55 is incrementally increased as the throttle position is advanced from idle to notch 8. Therefore maximum torque is realized in notch 8. The block 56 includes reset means for automatically reducing I* to a value corresponding to zero current when desired.

As is indicated in FIG. 2, the output line 55 of the block 56 is connected to a rate limit circuit 59 whose output supplies a current reference signal to one input of a summing point 60. The rate limit circuit 59 performs the conventional function of preventing the value of the current reference signal from being changed too fast. By way of example, the maximum rate of increase of the reference signal can be limited to a rate corresponding to 150 amps per second. The summing point 60 has another input which is supplied with the current feedback signal I on the line 33, and its output is an error signal which is representative of the difference between actual and desired magnitudes of motor current. Preferably the quiescent value of the error signal (i.e., its value whenever both the desired and actual magnitudes of current are zero) is slightly negative with respect to a predetermined reference potential. The error signal is supplied via a line 61 to a suitable gain network or amplifier 62 having a proportional plus integral transfer characteristic, whereby a zero steady-state error can be obtained. The amplifier 62 produces a control signal $V_c$ which is fed to one of the inputs of a block 65 labeled "firing reference generator." The value of $V_c$ varies, within limits, as a function of any difference or error between the current reference and feedback signals. So long as the error signal is "positive" (i.e., so long as the actual current magnitude is less than desired), the amplifier 62 causes $V_c$ to vary in a sense approaching a predetermined upper limit. The value of $V_c$ determines the ignition angles of the thyristor legs of the respective rectifying bridges 1, 2, and 3, and it will tend to assume whatever value results in reducing the error signal on line 61 to zero. In the illustrated embodiment of the converter controls, $V_c$ is an analog signal, and its magnitude can vary between 0 and $+10$ volts with respect to the predetermined reference potential. Preferably the reference potential is the same as that of a grounded conductor or bus in the d-c control power circuit.

As is shown in FIG. 2, additional inputs to the firing reference generator 65 are provided by the current call signal I* on line 55, the speed feedback signal S on line 28, the low current signal IL on line 35, and the low and high speed threshold signals SL and SH on lines 30 and 31, respectively. In a manner that is explained in more detail in connection with the description of FIG. 3, the firing reference generator 65 generates first, second, third, and fourth reference signals on four output lines 71, 72, 73, and 74, respectively. The first reference signal on line 71 will determine the ignition angle ($\alpha_1$) of the thyristor leg of bridge 1, and normally it is variable from 0 to $+10$ volts as $V_c$ varies over a first predetermined range of values extending from a first or low limit (e.g., 0 volts) to a preselected first intermediate value (e.g., 3.33 volts). The second reference signal on line 72 will determine the ignition angle ($\alpha_2$) of the thyristor leg of bridge 2, and normally it is variable from 0 to $+10$ volts as $V_c$ varies over a second predetermined range of values extending from approximately the aforesaid first intermediate value to a preselected second intermediate value (e.g., 6.67 volts) outside of the aforesaid first range. The third reference signal on line 73 will determine the ignition angle ($\alpha_3$) of the thyristor leg of bridge 3, and normally it is variable from 0 to $+10$ volts as $V_c$ varies over a third predetermined range of values extending from approximately the aforesaid second intermediate value to the aforesaid upper limit ($+10$ volts). The fourth reference signal on line 74 determines the desired extinction angle ($\beta$) of the thyristor leg of bridge 1, and normally it varies, within predetermined limits, as a predetermined function of motor speed.

The output lines 71-74 of the firing reference generator are coupled to a block 75 labeled "firing synchronizing and pulse generator." Suitable means are provided for supplying the block 75 with signals representative of alternating voltages VB1, VB2, and VB3 applied to the bridges 1, 2, and 3, respectively, and with a signal representative of the voltage V4 across the commutating capacitor 54 in the forced commutation subcircuit 4 that is associated with the thyristor leg of bridge 1. The current feedback signal I on line 33 provides an additional input to the block 75. In a manner that is explained in more detail in conjunction with the description of FIGS. 4 and 5, the firing synchronizing and pulse generator is normally operative to generate first, second, and third sets of periodic firing signals or gate pulses for respectively turning on the pairs of main thyristors in the bridges 1, 2, and 3 in synchronism with the applied voltages at ignition angles that can be advanced or retarded as desired. More particularly, the ignition angle at which the firing signals for bridge 1 are nominally generated will vary from fully retarded to fully advanced as the first reference signal on line 71 varies from 0 to $+10$ volts, the ignition angle at which the firing signals for bridge 2 are nominally generated will vary from fully retarded to fully advanced as the second reference signal on line 72 varies from 0 to $+10$ volts, and the ignition angle at which the firing signals for bridge 3 are nominally generated will vary from fully retarded to fully advanced as the third reference signal on line 73 varies from 0 to $+10$ volts. Thus the three bridges are controlled in sequence. As the control signal $V_c$ increases from its first limit to its upper limit, the average magnitude of the converter output voltage is increased in three stages. With $V_c$ increasing in the aforesaid first range of values, $\alpha_1$ decreases while $\alpha_2$ and $\alpha_3$ remain in their maximum retarded conditions, and $V_o$ equals the output voltage of bridge 1 alone. With $V_c$ increasing in the aforesaid second range, $\alpha_2$ decreases while $\alpha_3$ is fully retarded and $\alpha_1$ is nominally fully advanced, and $V_o$ equals the sum of the output voltage of bridges 1 and 2. Finally, with the value of $V_c$ increasing in the third range, $\alpha_3$ decreases while $\alpha_2$ and $\alpha_1$ are in maximum advanced conditions, and $V_O$ now equals the sum of output voltages from all three bridges.

Figure 6:
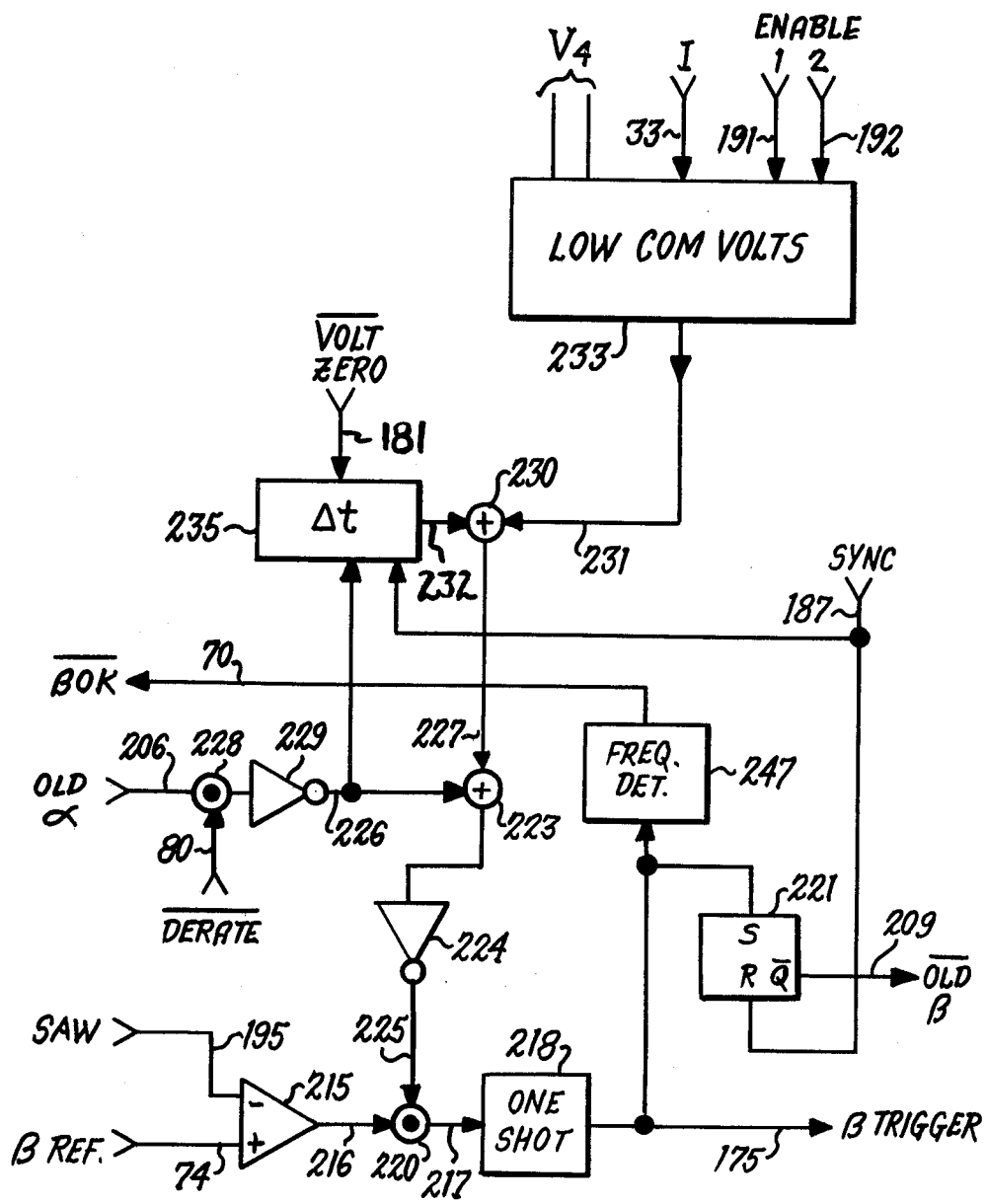
FIG. 6 is a schematic diagram of the "$\beta$ logic" circuit shown as a single block in FIG. 4, the output of this circuit comprising $\beta$ trigger signals which periodically activate the turn off gate pulse generator block labeled "#4 GPG" in FIG. 4.

As will be better understood from the description of FIG. 6, the firing synchronizing and pulse generator 75 is also operative to generate firing signals or gate pulses for the auxiliary controlled rectifiers in the forced commutation subcircuit 4 so that normally the main thyristors in bridge 1 are periodically turned off in synchronism with the voltage VB1 at an extinction angle determined by the magnitude of the fourth reference signal on line 74. In this manner the fundamental component of current in the transformer primary 40 is shifted to be more nearly in phase with the fundamental component of primary voltage, whereby the power factor of the locomotive propulsion system is improved.

Normal operation of the firing reference generator 65 and of the companion firing synchronizing and pulse generator 75 is sometimes prevented by the action of a block 76 labeled "derate and inhibit." Inputs to the block 76 are provided by the speed threshold signals SL and SH on lines 30 and 31, respectively, by the thyristor overcurrent signals F1, F2, and F3, and, if desired, by three transformer winding overcurrent signals T1, T2, and T3 which are received from blocks 77, 78, and 79, respectively. The blocks 77-79 represent conventional instantaneous overcurrent protective relays which are respectively coupled, by means of current transformers (not shown), to the secondary windings 41-43 of the power transformer 38, and each of them is effective to produce a signal T1, T2, or T3 in response to abnormally high transformer secondary current caused by the failure of any one of the valves in the diode leg of the associated bridge 1, 2 or 3.

As is shown in FIG. 2, the derate and inhibit block 76 has four output lines 80 through 83 connected to the block 75, and two of these lines (80 and 82) are also connected to the block 65. The block 76 includes logic circuits suitably arranged to produce a derate signal on the output line 80 and inhibit signals on the respective lines 81, 82, and 83 in response to various combinations of the signals that are received at its inputs. In a manner that is explained in more detail in connection with the description of FIG. 7, the circuits in block 76 are effective to produce:

(1) a first inhibit signal on the line 81 for preventing the generation of the first set of firing signals for bridge 1 in the event of an overcurrent signal F1 or T1 (indicating a bridge 1 fault);

(2) a second inhibit signal on the line 82 for preventing the generation of the second set of firing signals for bridge 2 and for adjusting the firing reference generator 65 so that the third reference signal on line 73 varies between 0 and +10 volts as the control signal $V_c$ varies over its second range of values (a) in the event of F2 or T2 (indicating a bridge 2 fault) or (b) whenever there is no bridge 1 fault, and motor speed is lower than the aforesaid low threshold (as indicated by the signal SL being "0");

(3) a derate signal on the line 80 for inhibiting the firing signals for the auxiliary rectifiers in the forced commutation subcircuit 4, for imposing a predetermined minimum limit on $\alpha_1$ (unless the magnitude of load current is lower than the aforesaid low level, as indicated by the signal IL being "0"), and for imposing the same minimum limit on $\alpha_3$ in the event of a fault in either bridge 1 or bridge 2; and (4) a third inhibit signal on the line 83 for preventing the generation of the third set of firing signals for the bridge 3 whenever (a) there are no overcurrent signals, and motor speed is lower than the aforesaid high threshold (as indicated by the signal SH being "0"), or (b) there is an overcurrent signal F3 or T3 (indicating a bridge 3 fault) or (c) there is a fault in bridge 1 or 2 but not both, and there is no fault in bridge 3, and motor speed is lower than its predetermined low threshold.

The aforesaid low threshold of motor speed is selected to be approximately equal to a calculated rate at which the first bridge is capable of supplying as much current to the motors as both bridges 1 and 2 combined under a condition of relatively low transformer primary voltage, which low voltage condition exists when the locomotive is a long distance from the nearest in-service wayside substation. It can be shown that under such a low voltage condition and at speeds below the calculated rate more current can be obtained from the output of bridge 1 alone than from the combined outputs of bridges 1 and 2, and therefore the maximum attainable performance of the propulsion system is increased by inhibiting the firing signals for bridge 2 (unless there is a fault in bridge 1) in the manner described in subparagraph 2b above.

The aforesaid high threshold of motor speed is selected to be approximately equal to another calculated rate at which the combination of bridges 1 and 2 is capable of supplying as much current to the motor as all three bridges combined under a low voltage condition. With low primary voltage and at speeds below the latter rate, more current can be obtained without an output from bridge 3 than with such an output, and therefore the maximum attainable performance of the propulsion system is increased by inhibiting the firing signals for bridge 3 (unless there is a fault in bridge 1 or 2) in the manner described in subparagraph 4a above.

The derate function described in subparagraph 3 above is a desirable feature if the power transformer 38 is so designed that the volt-ampere rating of each of its first and third secondary windings 41 and 43 is less than the volt-ampere rating of its secondary winding 42. Such a rating discrepancy is feasible because, in normal motoring operation of the propulsion system, the winding 42 will be subjected to an electric load that is higher than the load on winding 41 (because the conduction angles of the main thyristors in bridge 1 are normally limited by the periodic turn off action of the forced commutation subcircuit) and that is also higher than the load on the third winding 43 (because bridge 3 is in operation only at relatively high speeds when the magnitude of motor current is relatively low). However, in response to a fault in bridge 2, this bridge is removed from service, forced commutation of the thyristor leg of bridge 1 is prevented, and the controls are adjusted so that bridge 3 in effect is substituted for bridge 2. Now, except for the minimum limits imposed on $\alpha_1$ and $\alpha_3$ by the derate signal, both secondary windings 41 and 43 could be overloaded.

Figure 3:
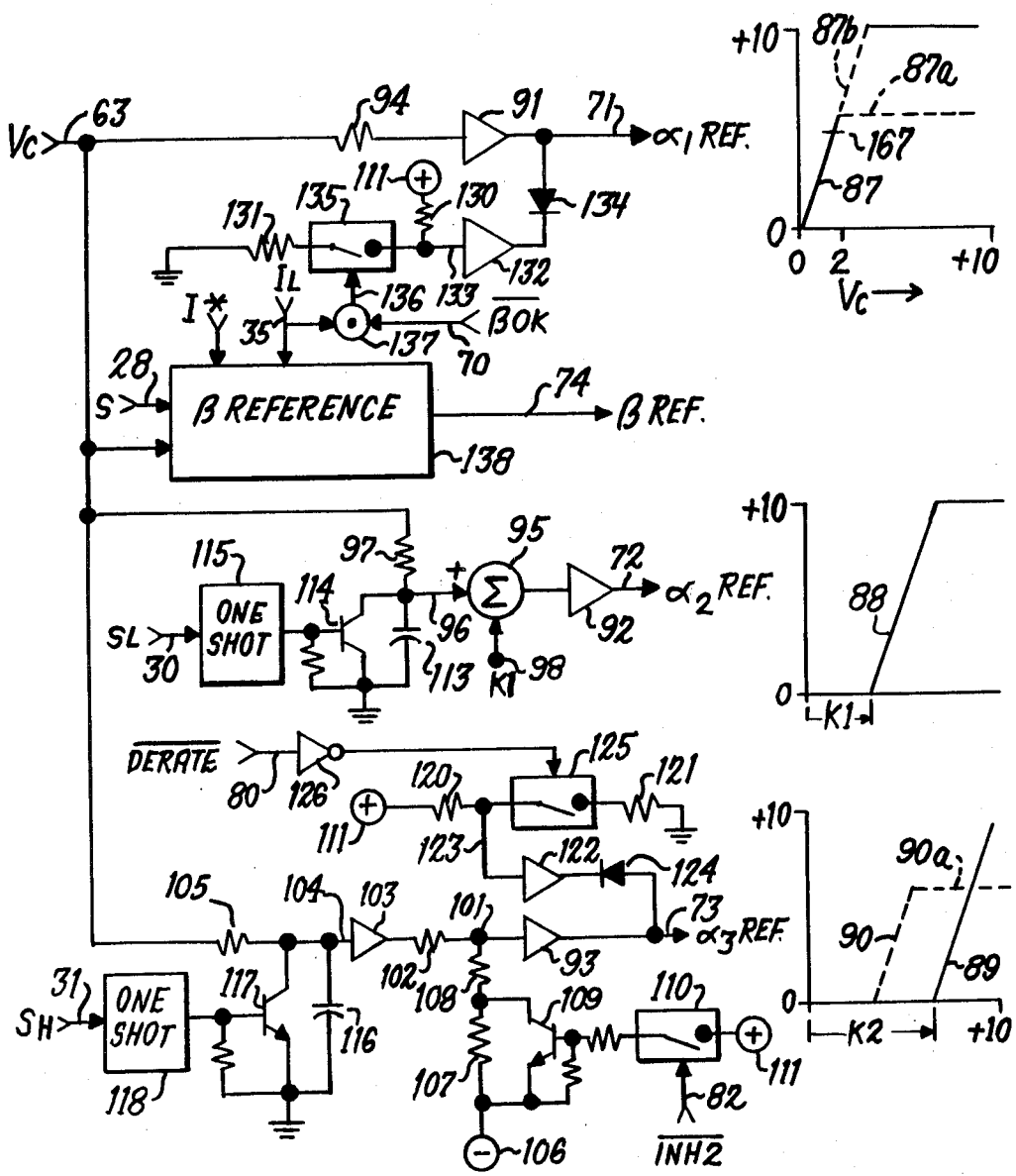
FIG. 3 is a schematic diagram of the firing reference generator circuit shown as a single block in FIG. 2, this circuit having three "$\alpha$REF." outputs which respectively determine the ignition angles of the controllable main valves in the three hybrid bridges and having a "$\beta$REF." output which determines the extinction angle of main valves in the first bridge.

FIG. 3 shows circuit details of the presently preferred embodiment of the firing reference generator 65. In the illustrated circuit, the control signal $V_c$ is fed on a line 63 to the inputs of three separate amplifiers 91, 92, and 93, and the first, second, and third reference signals on lines 71, 72, and 73 are respectively developed at the outputs of these amplifiers. Each of the amplifiers 91-93 has a gain of approximately 3 so that its ouput varies from 0 to +10 volts in response to an input signal excursion from 0 to +3.33 volts. In a manner and within limits that will be described hereinafter, the ignition angles of the main thyristors in each of the bridges 1, 2, and 3 will vary inversely with the value of the corresponding reference signal, being nominally 180 electrical degrees (fully retarded) whenever the reference signal has a negative or zero value and being nominally 0 degrees (fully advanced) when the reference signal is +10 volts. The input of the first amplifier 91 is connected to the control signal line 63 via a resistor 94, and as $V_c$ varies the first reference signal ($\alpha_1$ REF) on the output line 71 of this amplifier varies as shown by the trace 87 in the graph at the top of the right side of FIG. 3.

The input of the second amplifier 92 is connected to the control signal line 63 via a summing point 95, a line 96, and a resistor 97. Suitable means, represented in FIG. 3 by a terminal 98, is connected to the summing point 95 for subtracting a constant bias signal K1 from the control signal so that the input signal to the amplifier 92 comprises the difference between $V_c$ and K1. The value of K1 coincides with the aforesaid first intermediate value of $V_c$. It is selected to be +3.33 volts in the illustrated embodiment of the converter controls. The resulting variation of the second reference signal $\alpha_2$ REF) on the output line 72 of the second amplifier as $V_c$ varies is shown by the trace 88 in the graph drawn in the middle of the right side of FIG. 3. Whenever $V_c$ is less than 3.33 volts, $\alpha_2$ REF is negative.

The input of the third amplifier 93 is connected to the control signal line 63 via a summing point 101, a resistor 102, an operational amplifier 103 having a unity gain, a line 104, and a resistor 105. Suitable means is connected to the summing point 101 for introducing a constant negative bias so that the input signal to the amplifier 93 depends on the difference between $V_c$ and a second bias signal. In FIG. 3 this bias means comprises a relatively negative d-c control power terminal 106 connected to the summing point 101 via two resistors 107 and 108 in series. The resistor 107 is shunted by a transistor switch 109. The ohmic values of the resistors 107 and 108 are respectively selected so that when the transistor 109 is turned off the second bias signal is substantially the same as K1 but when the transistor 109 is conducting the second bias signal is K2 which coincides with the aforesaid second intermediate value of $V_c$. In the illustrated embodiment K2 is +6.67 volts. The conducting state of the transistor 109 is determined by a controllable solid-state switch 110 which connects its base to a relatively positive d-c control power terminal 111 and which in turn is controlled by the second inhibit signal (INH2) on line 82. In normal operation there is a high or "1" signal on line 82, the switch 110 is closed, the transistor 109 is therefore in its conducting state, and consequently the second bias signal is 6.67 volts. However, in the event of a fault in bridge 2 a second inhibit signal is produced by the above-described derate and inhibit block 76, whereby INH2 will now be low or "0", the switch 110 is open, the transistor 109 is therefore turned off, and the second bias signal is reduced to 3.33 volts. The resulting variation of the third amplifier's output signal ($\alpha_3$ REF) on the line 73 as $V_c$ varies is shown in the graph at the bottom of the right side of FIG. 3 by a solid-line trace 89 when INH2 is high and by a broken-line trace 90 when INH2 is low. Whenever the value of $V_c$ is less than the effective bias signal, $\alpha$hd 3 REF is negative.

The firing reference generator includes means responsive to the production of the low and high speed threshold signals SL and SH for momentarily resetting the input signals to the second and third amplifiers 92 and 93, respectively. The resetting means associated with the second amplifier comprises a capacitor 113 connected between the line 96 and ground, a normally turned off transistor switch 114 connected across the capacitor 113, and a conventional monostable multivibrator 115 (shown in FIG. 3 as a block labeled "one shot") connected to the base of the transistor 114. The signal SL on line 30 is supplied to the input of the block 115, and any 0-to-1 change of this signal causes the output of the one shot to turn on the transistor 114 for a predetermined brief period of time (e.g., one millisecond). This discharges the capacitor 113 and reduces the signal on line 96 to zero regardless of the value of $V_c$ at the time SL changed from 0 to 1. As soon as the brief period expires, the transistor 114 returns to its normally off state and the capacitor 113 can quickly recharge. During the recharging interval the signal on line 96, and hence $\alpha_2$ REF on the output line 72 of the second amplifier 92, smoothly increases to a valued determined by $V_c$. The resetting means associated with the third amplifier 93 comprises a capacitor 116 connected between the line 104 and ground, a normally turned off transistor switch 117 across the capacitor 116, and a one shot block 118 whose output is connected to the transistor 117 and whose input is supplied by the signal SH on line 31. These components operate in the same manner as the resetting means 113-115 to ensure that following any 0-to-1 change of the signal SH, $\alpha_3$ REF on the output line 73 of the amplifier 93 will ramp up from a negative value to a value determined by $V_c$.

The firing reference generator also includes means responsive to the derate signal on line 80 to clamp the third reference signal on line 73 to a predetermined maximum level, thereby imposing the aforesaid predetermined minimum limit on the ignition angle for the main thyristors in bridge 3. The maximum level of the reference signal on the output line 73 of the third amplifier 93 is established by means of a pair of resistors 120 and 121 connected in series with one another between the positive control power terminal 111 and ground. An amplifier 122 with the same gain as amplifier 93 has an input connected by a line 123 to the junction of these resistors and an output connected via a diode 124 to the line 73. The diode 124 is polled to prevent the value of the third reference signal on line 73 from being more positive than a maximum level which is determined by the fixed potential on the line 123. So long as the value of the third reference signal is not more positive than this maximum level, the diode 124 will be reverse biased and the clamping means is ineffective. A normally open solid-state switch 125 is connected in series with the resistor 121, whereby normally there is no current in resistor 120 and the potential on line 123 equals the high positive potential of the terminal 111.

The switch 125 is controlled by the signal on line 80 to which it is coupled through a signal inverter 126. In normal operation there is a high or "1" signal on line 80 and the switch 125 is open. However, in the event of a fault in either bridge 1 or bridge 2 a derate signal is produced by the above-described derate and inhibit block 76, and the resulting low or "0" signal on line 80 is inverted to a 1 which closes the switch 125. This causes the potential on line 123 to fall to the proper level to prevent $\alpha_3$ from becoming smaller than the desired minimum angle. The minimum angle is larger than approximately 50 electrical degrees, and preferably it is of the order of 70 to 75 degrees so that under derate conditions the load on the third secondary winding 43 of the power transformer 38 is limited to approximately 65 percent of maximum. The corresponding maximum level of $\alpha_3$ REF is shown by the horizontal part 90a of the trace 90 in the bottom graph of FIG. 3.

Means similar in construction and operation to the above-described clamping means 120-125 is connected to the output line 71 of the first amplifier 91 in FIG. 3. It comprises resistors 130 and 131, operational amplifier 132, line 133, diode 134, and solid-state switch 135. In this case, however, the switch 135 of the clamping means is controlled by a signal on the output line 136 of a conventional AND logic circuit 137 shown symbolically as an encircled dot having two inputs. The circuit 137 will produce an output signal that is high or 1 only when all of its inputs concurrently are 1; otherwise its output is low or 0. One input of circuit 137 is connected to the line 35 on which the low current signal IL is provided. IL is 1 except when the magnitude of motor current is lower than the aforesaid predetermined low level. The other input is connected to the line 70 which in turn is connected in the firing synchronizing and pulse generator 75 to a $\beta$ logic circuit which provides a signal ($\beta$OK) on this line that is 1 only when the generator 75 is not generating firing signals for periodically turning on the auxiliary controlled rectifiers in the forced commutation subcircuit 4 of bridge 1. If and when the output signal of the AND circuit 137 is 1, the switch 135 is closed and the value of the first reference signal on line 71 is prevented from becoming more positive than a predetermined maximum level corresponding to the aforesaid predetermined minimum limit of $\alpha_1$ (e.g., 73 degrees). Preferably, as is shown by the horizontal broken-line trace 87a in the top graph of FIG. 3, this maximum level of $\alpha_1$ REF is approximately +6 volts which is attained when $V_c$ increases to approximately 2 volts. Once the forced commutation subcircuit 4 is operating normally to turn off the main thyristors in bridge 1 ($\beta$OK =0), or whenever motor current is lower than its predetermined low level (IL =0), the output of the AND circuit 137 will be 0, the switch 135 is open, the clamping means 130-135 is disabled, $\alpha_1$ REF can rise above the maximum level 87a, and $\alpha_1$ can correspondingly decrease from its predetermined minimum angle until it attains a maximum advance condition. Limiting $\alpha$hd 1 to a predetermined minimum angle in the absence of forced commutation (unless motor current is then very low) is a feature of the converter controls disclosed and claimed in a related patent application Ser. No. 429,727 filed concurrently herewith in the names of P. G. Chandran and E. S. Matulevich and assigned to General Electric Company. For reasons that are explained therein, $V_c$ will exceed 3.33 volts at the time $\beta$OK changes from 1 to 0 during normal low-speed acceleration of the locomotive with the throttle 57 in notch 8. Therefore at that time there is a step increase in $\alpha_1$ REF from the maximum limit 87a to +10 volts (indicated by the broken-line part 87b of the trace 87 in the top graph of FIG. 3), and there is a correspondingly abrupt decrease in $\alpha_1$ to its maximum advanced condition.

In the firing reference generator 65 as it is illustrated in FIG. 3, the motor speed feedback signal S on the line 28 is fed to an input of a block 138 labeled "$\beta$ reference," and the fourth reference signal ($\beta$REF) on the line 74 is developed at the output of this block. It is the value of the latter signal that determines the desired firing angle of the auxiliary controlled rectifiers in the forced commutation subcircuit 4 and hence the extinction angle $\beta$ of the main thyristor leg of bridge 1. When $\beta$ REF is zero or has a negative value, no firing signals are generated for the auxiliary rectifiers in subcircuit 4. But when $\beta$ REF has a finite positive magnitude, $\beta$ varies inversely therewith. The $\beta$ reference circuit 138 is part of the claimed subject matter of the above-mentioned application of Chandran and Matulevich, and the construction and operation of a preferred embodiment of this circuit are fully described therein. Briefly summarized, $\beta$ REF decreases with increasing speed up to a predetermined speed threshold (e.g., 0.18 per unit), and it is maintained at a predetermined minimum positive value when speed is higher than this threshold. The circuit 138 includes disabling means effective to clamp $\beta$ REF at a negative value under certain conditions, including when motor speed is lower than preselected minimum which is dependent on the command signal (i.e., the setting of the locomotive throttle 57) and when motor current is lower than the aforesaid low level at which the signal IL on line 35 changes state.

Figure 4:
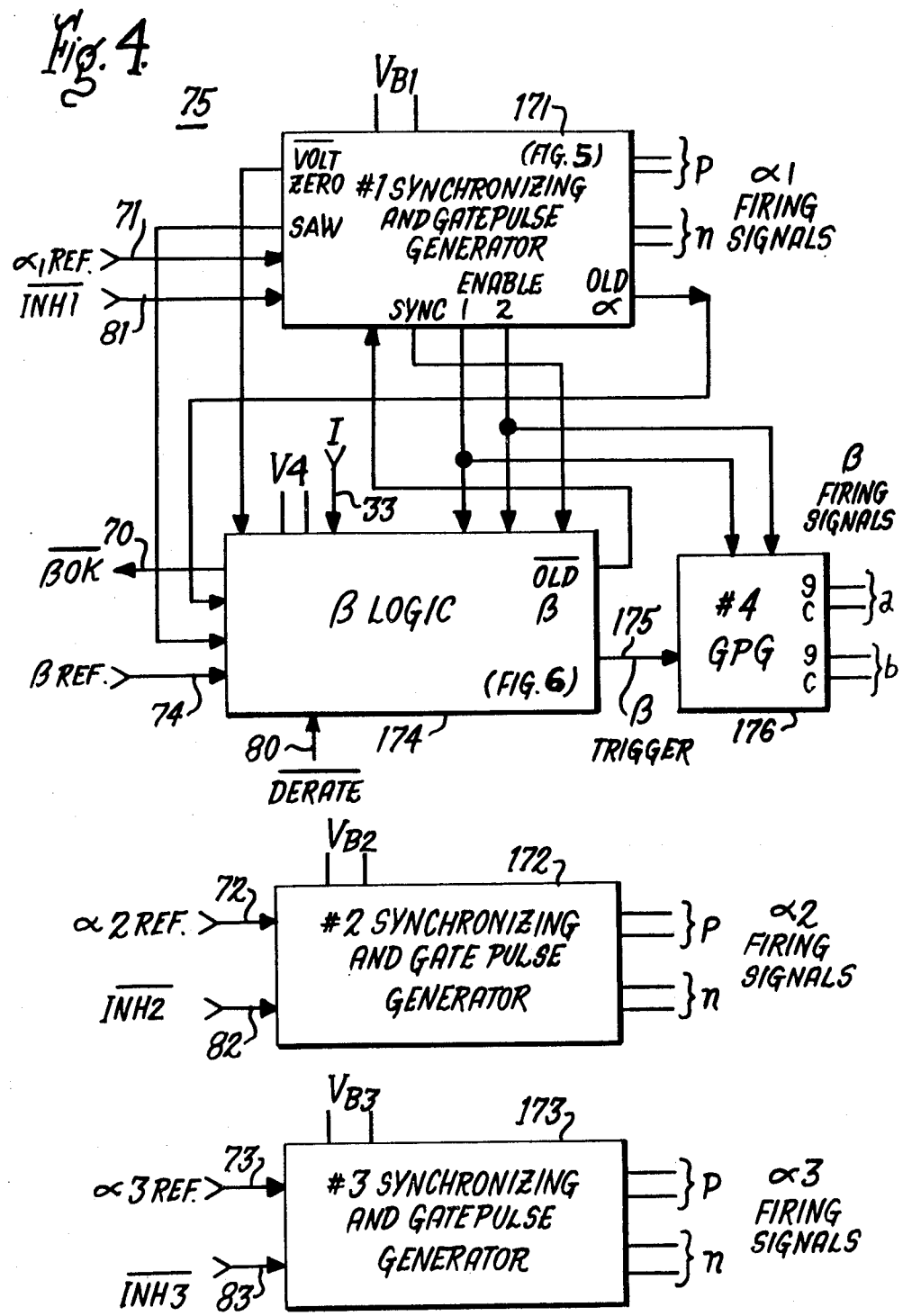
FIG. 4 is an expanded functional block diagram of the firing synchronizing and pulse generator block of FIG. 2.

The signals on the respective output lines 71–74 of the firing reference generator 65 are fed to the firing synchronizing and pulse generator 75. As is shown in FIG. 4, the latter generator actually comprises three separate synchronizing and gate pulse generators 171, 172 and 173 which, at ignition angles that are respectively determined by the values of the first, second and third reference signals on line 71, 72 and 73, generate the first, second, and third sets of periodic firing signals that are coupled to the gates of the main thyristors T_p and T_n in the bridges 1, 2 and 3, respectively. It also comprises a block 174 labeled "$\beta$ logic" that is fed by the fourth reference signal ($\beta$ REF) on line 74 and that is interconnected with the #1 generator 171. The block 174 is suitably constructed and arranged to produce periodic trigger signals which are fed over a line 175 to a block 176 labeled "#4 GPG." In response to the trigger signals on line 175 and to steering signals received from "enable" 1 and 2 outputs of the generator 171, the block 176 generates firing signals that are coupled to the gates of the auxiliary controlled rectifiers T4a and T4b in the forced commutation subcircuit, which signals in effect are turn off signals for the pair of main thyristors in bridge 1. Circuit details of the presently preferred embodiment of the #1 synchronizing and gate pulse generator 171 are shown in FIG. 5, and circuit details of the presently preferred embodiment of the $\beta$ logic block 174 are shown in FIG. 6.

Figure 5:
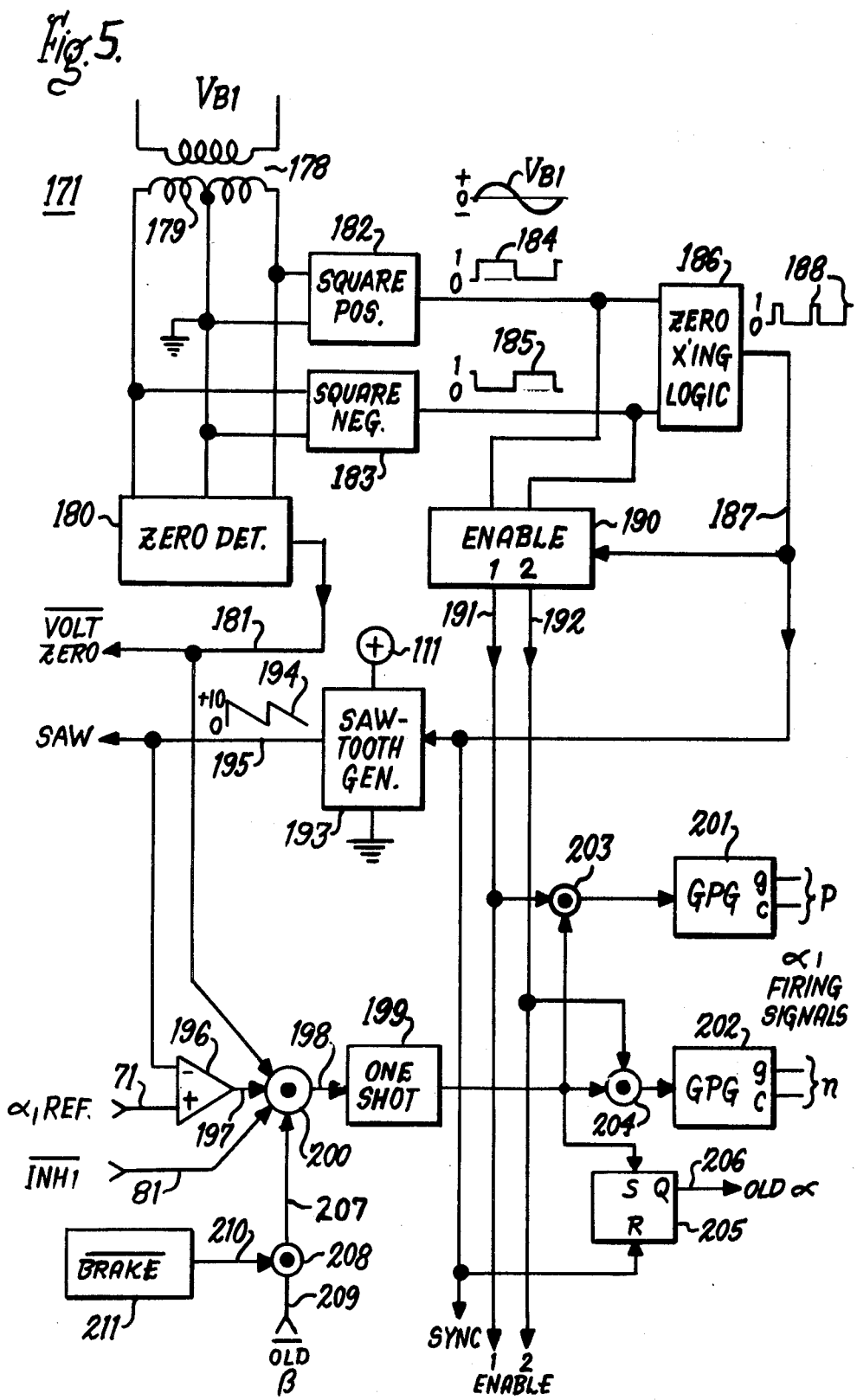
FIG. 5 is schematic diagram of the #1 synchronizing and gate pulse generator circuit shown as a single block in FIG. 4, the output of this circuit comprising a first set of firing signals for the pair of main valves in the first bridge.

As can be seen in FIG. 5, one input of the #1 generator 171 is supplied with the signal $\alpha_1$ REF on line 71, and another input receives a signal VB1 representative of the alternating voltage applied to bridge 1 (i.e., the voltage between the respective junctures of the diodes D1p and D1n and of the main thyristors T1p and T1n). The latter signal energizes the primary of a single-phase instrument transformer 178 having a center-tapped secondary winding 179 which is connected to bistable voltage detecting means 180 and which is also connected to squaring means comprising two blocks 182 and 183 which are respectively labeled "square pos." and "square neg." The purpose of the voltage detecting means 180 is to indicate when VB1 is zero; it has a "0" output state whenever the magnitude of VB1 is negligible and a "1" output state whenever the magnitude of VB1 is appreciable. More specifically, the signal "volt zero" on the output line 181 of the detector 180 is 1 only if and when the instantaneous magnitude of the alternating voltage applied to bridge 1 equals or exceeds a predetermined low level. Preferably this "pick up" level of the detector 180 is approximately 25 percent of the peak magnitude of V1 under a full voltage condition when the locomotive is adjacent to a wayside substation.

During each "positive" half cycle of VB1 the squaring means is operative to produce a "1" digital logic signal 184 at the output of the block 182, and during each "negative" half cycle of VB1 a "1" signal 185 is produced at the output of the block 183. The squared signals 184 and 185 are supplied to a zero crossing logic circuit 186 which is suitably constructed and arranged to produce, on its output line 187, a train of synchronizing signals or sync pulses 188 that are "1" for relatively short, constant periods of time precisely coinciding with successive zero crossings of VB1. The signals 184, 185, and 188 are supplied to inputs of a block 190 labeled "enable," which block has two output lines 191 and 192. The purpose of this component is to correct any asymmetry that may exist in the squared signals 184 and 185. It is suitably constructed and arranged to provide a "1" steering or enable signal on line 191 that is concurrent with each positive half cycle of VB1 and alternately to provide a "1" steering or enable signal on line 192 that is concurrent with each negative half cycle of VB1.

The circuits illustrated in FIG. 5 also include suitable means responsive to the sync pulses 188 on line 187 for providing a timing signal that is coordinated with the zero crossings of VB1. Preferably the timing signal is provided by a conventional saw-tooth generator 193 connected between a relatively positive d-c control power terminal 111 and ground. This component generates a saw-tooth voltage wave in synchronism with VB1. More particularly, the ouput of the generator 193 is an analog signal 194 the value of which increases abruptly to +10 volts in response to each sync pulse and then decreases at a constant rate that results in the signal 194 falling from +10 volts to 0 in a half period of VB1. The saw-tooth voltage signal 194 is fed via the output line 195 of the generator 193 to the negative input of a comparator 196 whose positive input comprises the reference signal on line 71. Consequently the signal on the output line 197 of the comparator 196 will change from 1 to 0 when the saw-tooth signal rises to +10 volts at the start of each half cycle, and subsequently it will change from 0 to 1 each time a falling saw-tooth signal intersects the first reference signal, i.e., at the instant when the value of the saw-tooth signal just equals the value of the reference signal. So long as the first reference signal on line 71 is positive, the lower its magnitude the later the signal on line 197 changes from 0 to 1 in each half cycle of VB1. As the reference signal approaches 0, the 0-to-1 change on line 197 occurs at an electrical angle approaching 180 degrees. If the reference signal were negative, the signal on line 197 would remain 0.

The output line 197 from the comparator 196 is coupled to the input line 198 of a monostable multivibrator 199 (which is shown as a block labeled "one shot") by way of suitable AND logic means 200 (shown symbolically in FIG. 5 by an encircled dot having four inputs). The one shot block 199 is operative in response to each 0-to-1 change of the signal on its input line to produce at its output a brief "1" signal or $\alpha$ trigger pulse of fixed duration (e.g., 15 microseconds). Consecutive trigger pulses from the block 199 will alternately activate a pair of gate pulse generators 201 and 202, depending on which one of these generators is "enabled" by a steering signal from the enable block 190. Throughout a positive half cycle of VB1, the "1" signal on line 191 is supplied to one input of an AND logic circuit 203 which therefore passes the trigger pulse from the one shot 199 to the first gate pulse generator 201, whereas throughout a negative half cycle of VB1, the "1" signal on line 192 is supplied to one input of another AND logic circuit 204 which therefore passes the trigger pulse from the one shot 199 to the second gate pulse generator 202. When the generator 201 is activated by an $\alpha$ trigger pulse, it transmits an appropriate firing signal to the gate electrode and cathode of the main thyristor T1$p$ in bridge 1, and when the generator 202 is activated by the next $\alpha$ trigger pulse, it will transmit an appropriate firing signal to the gate electrode and cathode of the main thyristor T1$n$ in bridge 1. Thus the #1 generator 171 normally generates the first set of firing signals at an ignition angle $\alpha_1$ which coincides with the angle (measured in electrical degrees from the start of each half cycle of VB1) of the 0-to-1 change of the comparator output signal on line 197.

The trigger pulses produced at the output of the one shot 199 are also fed to a "set" input of a conventional bistable flip flop device 205. This device has a "reset" input connected to the sync pulse line 187 and a "Q" output connected to an output line 206, whereby a 1 signal (referred to as "old $\alpha$") is provided on the line 206 except during recurrent intervals that commence at each zero crossing of VB1, as indicated by a sync pulse 188 on line 187, and that terminate with the next generation of an $\alpha_1$ firing signal. The output line 206 is connected to the $\beta$ logic circuit 174 where, in a manner that will soon be explained in conjunction with the description of FIG. 6, a 0 signal on this line is effective to prevent any production of a $\beta$ trigger signal on line 175 prior to an $\alpha$ trigger pulse being produced by the one shot 199 during each half cycle of VB1.

The AND logic means 200 will prevent the one shot device 199 from responding normally to a 0-to-1 change of the comparator output signal on line 197 if any one of the signals supplied to its various inputs is 0. So long as any 0 signal is being supplied to the logic means 200, the signal on line 198 will remain 0 and the device 199 cannot produce any $\alpha_1$ trigger pulse. This inhibits the first set of firing signals and consequently blocks the thyristor turn on operation of the #1 generator 171. As is shown in FIG. 5, one of the input signals to the logic means 200 comprises the first inhibit signal (INH1) on line 81. In normal operation INH1 is 1, but it will change to 0 when the derate and inhibit block 76 (FIG. 2) detects a bridge 1 fault, in which event normal operation of the one shot 199 will be prevented.

Another input to the logic means 200 comprises the volt zero signal on line 181. This signal is 0 whenever the instantaneous magnitude of alternating voltage applied to bridge 1 is lower than the aforesaid predetermined low level, as is true if the power transformer primary winding 40 is deenergized (e.g., when the pantograph 46 of the locomotive is traversing a phase break in the catenary 47), during commutation notches (i.e., during the commutation interval following the firing of each of the main thyristors in bridge 1), and immediately before and after each zero crossing of VB1. It will now be apparent that the selection of the pickup level of the zero voltage detector 180 determines minimum and maximum limits of $\alpha_1$ when $\alpha_1$ REF is near 0 volts or +10 volts. For example, assuming that the pickup level is 25 percent of the peak magnitude of V1 at full line voltage, the $\alpha_1$ firing signals cannot be actually generated at an ignition angle more advanced than approximately 15° or more retarded than approximately 165°. Such limits are desirable because they prevent any attempt to fire a main thyristor when the magnitude of its annode-to-cathode voltage is too low to ensure successful turn on.

Yet another input to the logic means 200 is provided over a line 207 from the output of a companion AND logic circuit 208 having two input lines 209 and 210. The signal on line 207 is 1 whenever the signals on both lines 209 and 210 are concurrently 1, and otherwise it is 0. The line 209 is connected to the logic circuit 174 (FIG. 6) where it receives a 0 signal only during recurrent intervals that commence with the generation of a $\beta$ firing signal during each positive or negative half cycle of VB1 and that terminate at the end of the half cycle. The line 210 is connected to a block 211 (labeled "brake" in FIG. 5) which normally produces a 1 output signal but which is suitably constructed and arranged to change its output signal to 0 when the locomotive is operating in a braking mode rather than a motoring mode.

The #2 and #3 synchronizing and gate pulse generators 172 and 173 are constructed similarly to and operate in essentially the same manner as the #1 generator 171 just described with reference to FIG. 5. However, they do not use the flip flop 205, the logic circuit 208, the lines 209 and 210, and the block 211. The input signals VB1, $\alpha_1$ REF, and INH1 are replaced in the #2 generator 172 by VB2, $\alpha_2$ REF, and INH2, respectively, and in the #3 generator 173 by VB3, $\alpha_3$ REF, and the third inhibit signal (INH3) on line 83, respectively.

Assuming there is no bridge fault, the signal INH2 will change from 0 to 1 contemporaneously with the low speed signal SL changing from 0 to 1 when motor speed attains the aforesaid low threshold. At the same time the resetting means 113–115 in the firing reference generator 65 (FIG. 3) operates momentarily to reduce the second reference signal ($\alpha_2$ REF) to a negative magnitude regardless of the value of the control signal $V_c$. Subsequently $\alpha_2$ REF is permitted to increase smoothly to a positive magnitude determined by $V_c$. If $V_c$ is then more than K1, as soon as INH2 changes from 0 to 1 during low speed acceleration of the locomotive (which change enables the #2 generator 172 to start generating firing signals for the main thyristors in bridge 2), $\alpha_2$ begins an orderly advance from a maximum retarded condition to the angle determined by $V_c$. This ensures that the average magnitude of the ouput voltage of bridge 2 will increase gradually rather than abruptly when this bridge is initially "turned on." The signal INH3 will change from 0 to 1 contemporaneously with the high speed signal SH changing from 0 to 1 when motor speed attains the aforesaid high threshold, and at the same time the resetting means 116–118 in the firing reference generator 65 (FIG. 3) operates momentarily to reduce $\alpha_3$ REF to a negative magnitude. Thereafter, in the same manner as described above, if $V_c$ is more than K2 $\alpha_3$ REF will smoothly increase so that $\alpha_3$ advances in an orderly fashion from maximum retard to the angle determined by $V_c$. This ensures that when bridge 3 is initially "turned on" its output voltage will increase smoothly.

As is shown in FIG. 4, the #1 synchronizing and gate pulse generator 171 (FIG. 5) is interconnected with the $\beta$ logic circuit 174. The latter circuit will now be described with reference to FIG. 6. It includes a comparator 215 having two inputs. The saw-tooth voltage signal (194) from the #1 generator 171 is fed via line 195 to the negative input of this comparator, and the fourth reference signal ($\beta$ REF) on line 74 from the firing reference generator 65 is fed to the positive input of the comparator 215. Consequently the signal on the output line 216 of the comparator will change from 0 to 1 each time a falling saw tooth signal on line 195 intersects a reference signal of positive magnitude on line 74. The line 216 is coupled to the input line 217 of a monostable multivibrator (one shot) 218 via AND logic means 220 shown symbolically in FIG. 6 by an encircled dot having multiple inputs. The output of the one shot device 218 appears on the output line 175 of the $\beta$ logic circuit, and this device is operative periodically, in response to successive 0-to-1 changes of the signal on its input line 217, to produce a train of discrete $\beta$ trigger signals on the line 175. These trigger signals are supplied to the #4 gate pulse generator 176 (FIG. 4) which comprises suitable means, including logic circuits similar to those shown at 203 and 204 in FIG. 5, for alternately transmitting appropriate firing signals to the respective auxiliary controlled rectifiers in the forced commutation subcircuit 4 in response to consecutive signals on line 175. As a result, the turn off action of each of the main thyristors T1$p$ and T1$n$ in bridge 1 is initiated at an extinction angle $\beta$ that normally coincides with the "angle" of the 0-to-1 change of the comparator output signal on line 216. It will now be apparent that the lower the value of $\beta$ REF the later this change occurs in each half cycle of applied voltage (VB1), and hence the desired $\beta$ varies inversely with the value of $\beta$ REF. When the disabling means in the reference generator 65 are not effective to keep $\beta$ REF at a negative value, this signal has a positive magnitude that decreases with increasing motor speed up to a predetermined speed threshold at which $\beta$ is clamped at a maximum limit (e.g., 95°), all as is explained more fully in the above-mentioned concurrently filed application of Chandran and Matulevich.

The trigger signals on output line 175 are also fed to a "set" input of a flip flop device 221 which has a "reset" input connected to the sync pulse line 187 and a "Q bar" output connected to the line 209. The output signal of this device is 1 except during the aforesaid recurring intervals commencing with the production of each $\beta$ trigger signal and terminating at the next sync pulse (188) on line 187 (which marks the end of either a positive or negative half cycle of the alternating voltage applied to bridge 1). The line 209 is coupled in the #1 generator (FIG. 5) to the input line 207 of the logic means 200, and once a $\beta$ trigger signal is produced on line 175 the resulting 0 signal on line 209 is effective to inhibit another $\alpha_1$ firing signal until the next half cycle.

The AND logic means 220 will prevent the one shot device 218 from responding normally to a 0-to-1 change of the comparator output signal on line 216 if the signal supplied to its second input is 0. So long as any 0 signal is being supplied to the logic means 220, the signal on line 217 will remain 0 and the device 218 cannot produce any $\beta$ trigger signals on line 175. This inhibits the firing signals for the auxiliary rectifiers in the forced commutation subcircuit 4 and consequently blocks the thyristor turn off operation of the converter controls.

The second input signal supplied to the logic means 220 comprises the inverted output signal of a conventional OR logic circuit 223 shown symbolically in FIG. 6 by an encircled plus sign. The output of this circuit is connected to an input of the logic means 220 via a signal inverter 224 and a line 225. The signal on line 225 is 0 so long as there is a 1 signal on either of the two input lines 226 and 227 of the circuit 223, and it is 1 only when the signals on both input lines are concurrently 0. The first input line 226 is supplied with the inverted output signal of an AND logic circuit 228 to which it is connected via a signal inverter 229. The two inputs of the latter circuit are connected to the lines 80 and 206, respectively. The output signal of the logic circuit 228 will be 0 (and the signal on line 226 will therefore be 1) so long as there is a 0 signal on either line 80 or line 206; otherwise it is 1. As a result, a 0 signal is maintained on the input line 225 of the logic means 220 and normal operation of the one shot 218 is prevented whenever the derate signal on line 80 is 0 (as is the case when the derate and inhibit block 76 detects a fault in either bridge 1 or bridge 2) or whenever the old $\alpha$ signal on line 206 is 0 (as is true during the aforesaid recurrent intervals commencing at the start of each half cycle of the alternating voltage applied to the a-c terminals of bridge 1 and terminating in response to the next turn on of thyristor T1$p$ or T1$n$ in the same bridge).

The second input line 227 to the OR logic circuit 223 is supplied with the output signal of a companion OR logic circuit 230 having two input lines 231 and 232. As can be seen in Fig. 6, line 231 is connected to the ouput of a block 233 labeled "low com volts" which in turn receives as inputs the current feedback signal I on line 33, a signal representative of the voltage V4 across the commutating capacitor 54, and the enable 1 and 2 signals on lines 191 and 192, respectively. The purpose of the component 233 is to block or inhibit the normal thyristor turn off operation of the $\beta$ logic circuit 174 by providing a 1 signal on line 231 (and hence a 0 signal on line 225) anytime the magnitude of V4 is insufficient to ensure successful forced commutation of the load current being conducted by the main thyristors in bridge 1. The circuit details, operation, and advantages of such a component are disclosed and claimed in a copending patent application Ser. No. 454,207 filed on Dec. 29, 1982, in the names of H. J. Brown, A. K. Kumar, and E.

S. Matulevich and assigned to General Electric Company.

The second input line 232 to the OR logic circuit 230 is connected to the ouput of a block 235 labeled "Δt" which in turn receives as inputs the volt zero signal on line 181, the sync pulses on line 187, and the inverted old α signal on line 226. The component 235 comprises a time delay circuit suitably constructed and arranged to provide a periodic 1 signal on line 232 (and hence a 0 signal on line 225) until a short time after each turn on of a main thyristor in bridge 1 so as temporarily to extend the aforesaid recurrent intervals during which normal thyristor turn off operation of the β logic circuit is blocked, whereby each of the diodes D1p and D1n in bridge 1 has sufficient time to fully recover its reverse blocking capability after load current is commutated to the corresponding main thyristor before the complementary auxiliary rectifier can be fired. This feature of the β logic circuit is the claimed subject matter of a patent application Ser. No. 429,728 filed concurrently herewith in the names of H. J. Brown, I. N. Horvat, and A. K. Kumar and assigned to General Electric Company.

A 0 signal on line 225 prevents the logic means 220 from passing to the input line 217 of the one shot 218 any 0-to-1 signal change on the output line 216 of the comparator 215. During each half cycle the one shot 218 will actually produce a β trigger signal on line 175 in response to either the 0-to-1 change of the signal on line 216 or the 0-to-1 change of the signal on line 225, whichever occurs later. If $α_1$ exceeds the desired β, the 0-to-1 change on line 225 is later, and consequently the β trigger signal is produced by the one shot 218 immediately upon termination of the interval during which there is a 1 signal on output line 232 of the time delay circuit 235. In this event the actual extinction angle is greater than desired. When β exceeds $α_1$ by a sufficient margin, the 0-to-1 change on line 216 is later and the β trigger signal coincides with this change. In either case, the generation of firing signals for the auxiliary controlled rectifiers in the forced the generation of firing signals for the commutation subcircuit 4 of bridge 1 is properly coordinated with main thyristors in the same bridge.

The β logic circuit includes means 247 responsive to the frequency of the β trigger signals on line 175 for providing the signal βOK on line 70. The frequency responsive means 247 is suitably constructed and arranged so that βOK is 1 except when the one shot device 218 is operating normally in response to periodic 0-to-1 signal changes on line 217 to produce a train of β trigger signals having a frequency higher than a predetermined magnitude (e.g., approximately 1.4 times the frequency of V1). The βOK signal on line 70 is supplied to the clamping means 130–135 in the firing reference generator 65 (FIG. 3).

As was mentioned above in conjunction with the description of FIG. 2, the converter controls include derate and inhibit means 76 for producing the derate signal on line 80 and the first, second, and third inhibit signals on the lines 81, 82, and 83, respectively. The presently preferred embodiment of such means is shown in FIG. 7 which will now be described.

As illustrated in FIG. 7, the derate and inhibit means 76 comprises first, second and third fault detectors 291, 292 and 293 the outputs of which are connected to lines 301, 302 and 303, respectively. Each of these fault detectors has a pair of inputs to which a thyristor overcurrent signal (F1, F2, or F3) and a transformer secondary overcurrent signal (T1, T2, or T3) are respectively fed from a corresponding one of the bridges 1, 2 and 3, and it is suitably designed to change its output state from 1 to 0 in response to a fault occurring in its associated bridge as indicated by either one or both of the respective overcurrent signals being produced as hereinbefore described. Thus a 0 signal on line 301 will herein be referred to as a fault signal BR1 for bridge 1, a 0 signal on line 302 will be referred to as a fault signal BR2 for bridge 2, and a 0 signal on line 303 will be referred to as a fault signal BR3 for bridge 3.

The output line 301 of the first fault detector 291 is connected directly to the output line 81 of the derate and inhibit means 76. Therefore the first inhibit signal INH1 on line 81 is normally 1 and is 0 only when there is a bridge 1 fault. If and when INH1 is 0, the AND logic means 200 in the #1 synchronizing and gate pulse generator 171 (FIG. 5) inhibits the first set of firing signals for bridge 1. The line 301 is also connected through a conventional NAND logic component 304 and a signal inverter 305 to the output line 80, whereby the derate signal on the latter line is 0 whenever there is a bridge 1 fault.

The output line 302 of the fault detector 292 for bridge 2 is connected to the output line 82 of the means 76 via two NAND logic components 306 and 307 in tandem. It is also connected through the NAND component 304 and the inverter 305 to the line 80, whereby the derate signal is 0 whenever there is a bridge 2 fault but is 1 under normal conditions when both of the signals BR1 and BR2 are concurrently 1. If and when the derate signal is 0, the signal on the input line 225 of the AND logic means 220 in the β logic circuit 174 (FIG. 6) is 0, and this will inhibit or block the generation of any firing signals for the auxiliary controlled rectifiers in the forced commutation subcircuit 4 associated with bridge 1.

The second input of the NAND component 306 is coupled by means of a line 309 and a blocking diode 310 to the low speed threshold line 30 which is connected to a +15 volt d-c control power terminal 311 through a resistor 312. The output of component 306 is low or 0 only when the signal SL on line 30 (and hence the signal on line 309) is 1 (which is true when motor speed is higher than its aforesaid low threshold) and concurrently the signal BR2 on line 302 is 1 (which is normally true so long as there is no bridge 2 fault), in which case the second inhibit signal INH2 on line 82 is 1. The second input of the NAND component 307 is connected to the output line 301 of the first fault detector 291, and consequently INH2 is 1 whenever BR1 is 0 (indicating a bridge 1 fault) regardless of whether the motor speed is above or below its low threshold. In this event bridge 2 can be "turned on" initially to help accelerate the locomotive from rest without waiting for the speed to attain that threshold.

Under normal conditions both BR1 and BR2 are 1, INH2 will now have the same state as SL, and the #2 synchronizing and gate pulse generator 172 is prevented from generating the second set of firing signals for bridge 2 so long as motor speed is lower than the threshold at which SL changes states. In the abnormal event of a bridge 2 fault, INH2 is 0 unless there is also a bridge 1 fault. While not shown in the drawings, there is a connection from line 302 via a terminal 313 to the input line 207 of the AND logic means 200 in the #2 generator 172 so that the second set of firing signals is inhibited whenever there is a bridge 2 fault even if INH2 were 1 because of a concurrent bridge 1 fault.

The output line 303 of the third fault detector 293 for bridge 3 is connected to the output line 83 of the derate and inhibit means 76 via another two NAND logic components 314 and 315 in tandem. It is also connected to a terminal 316. The second input of the component 314 is connected to the output line 317 of yet another NAND logic component 318 having two inputs. The first input of component 318 is coupled by means of a line 319, a signal inverter 320, and a blocking diode 321 to the high speed threshold line 31 which is connected to the positive control power terminal 311 through a resistor 322. The second input of component 318 is connected to the output line 324 of a NAND logic component 325 whose inputs in turn are respectively connected to the line 309 and to the output of the NAND component 304.

The second input of the NAND component 315 shown in FIG. 7 is connected to the output line 326 of a similar component 327 whose two inputs are respectively connected through signal inverters 328 and 329 to the output lines 301 and 302 of the fault detectors 291 and 292, whereby the signal on line 326 is normally 1 and becomes 0 only in the rare case of concurrent faults in both of the bridges 1 and 2. Assuming that the signal on line 326 remains 1, the state of the third inhibit signal INH3 on line 83 depends solely on the output of the NAND logic component 314. The latter output is 0, and consequently INH3 is 1, whenever the signals on the lines 303 and 317 are concurrently 1. This is true only when there is no bridge 3 fault and there is a 0 signal on one or both of the lines 319 and 324 connected to the two inputs of logic component 318. The signal on line 319 will be 0 if and when the signal SH on line 31 is 1, indicating that motor speed is higher than its aforesaid high threshold. The signal on line 324 is 0 only if motor speed is higher than its low threshold (whereby the signals on lines 30 and 309 are 1) and if there is a fault in bridge 1 and/or bridge 2 (whereby the output of component 304 is 1).

Under normal conditions, there are no faults in the three bridges, and INH3 will have the same state as the signal on the output line 317 of the component 318. Normally the latter signal tracks the signal SH on line 31; when motor speed is lower than its high threshold the signal on line 317 (and hence INH3) is 0, in which case the #3 synchronizing and gate pulse generator 173 is prevented from generating the third set of firing signals for bridge 3. But if there were a fault in bridge 1 or 2, the signal on line 317 would change from 0 to 1 simultaneously with the 1-to-0 signal change on line 324 as a result of motor speed increasing through the low threshold at which SL changes states, and consequently the #3 generator 173 is able to start generating firing signals for bridge 3 as soon as the accelerating locomotive attains that low threshold (assuming that the third fault detector 293 is not then producing a 0 signal on line 303). If there were concurrent faults in bridges 1 and 2, the signal on line 326 would be 0, INH3 would consequently be 1, and bridge 3 can now be "turned on" initially to help accelerate the locomotive from rest without waiting for the speed to attain even its low threshold. A connection (not shown) is made between the terminal 316 and the input line 207 of the AND logic means 200 in the #3 generator 173 so that the third set of firing signals is inhibited whenever there is a bridge 3 fault even if INH3 were 1 because of concurrent faults in bridges 1 and 2.

It will now be apparent that the logic circuits in the derate and inhibit means 76 will automatically respond to various combinations of bridge faults by effectively resequencing the converter controls so that: bridge 2 is substituted for bridge 1 and bridge 3 is substituted for bridge 2 in the event of a bridge 1 fault; bridge 3 is substituted for bridge 2 in the event of a bridge 2 fault; and the speed threshold for permitting normal operation of bridge 3 is reduced to zero in the event of concurrent faults in bridges 1 and 2. As a result, the locomotive propulsion system is able to continue operating with only one bridge or any combination of two bridges in service. In this emergency mode of operation there is no forced commutation of bridge 1, and bridges 1 and 3 are derated by limiting the ignition angles of their firing signals to predetermined minimums (e.g., 73°) consistent with the volt-ampere ratings of the transformer secondaries 41 and 43, respectively. Note that such derating will not prevent maximum motor current (and torque) from being obtained at low speeds, and it will not prevent high speed operation of the locomotive on level track.

While a preferred emobodiment of the invention has been shown and described by way of illustration, various modifications thereof will probably occur to persons skilled in the art. It is therefore intended by the concluding claims to cover all such changes and modifications as fall within the true spirit and scope of this invention.

We claim:

1. Improved means for controlling an electric power converter used to supply direct current to at least one electric motor, said converter comprising the combination of first, second, and third rectifying circuits each having a-c input terminals, a pair of d-c output terminals, and controllable means including at least one pair of alternately conducting main electric valves for interconnecting said input and output terminals so as to convert alternating voltage at said input terminals to direct voltage of variable average magnitude at said output terminals, the pair of main valves in said first rectifying circuit having cyclically operative valve turn off means respectively associated therewith, means for respectively applying a plurality of in-phase alternating voltages from an a-c power source to corresponding input terminals of said rectifying circuits, means for serially connecting the output terminal pairs of said rectifying circuits to an electric load circuit including said motor, whereby the voltage applied to said load circuit is the sum of the output voltages of all of said rectifying circuits, means for providing a speed feedback signal representative of the speed of said motor, fault detecting means associated with said rectifying circuits for producing first, second and third fault signals in the abnormal event of short circuits in said first, second and third rectifying circuits, respectively, means for producing a control signal having a value that varies between predetermined first and second limits, and control means responsive to said control signal and normally operative to generate first, second and third sets of periodic firing signals for respectively turning on said pairs of main valves in said first, second and third rectifying circuits in synchronism with the alternating voltages applied to their respective input terminals, the firing signals of said first set being nominally generated at an ignition angle ($\alpha_1$) that varies from fully retarded to fully advanced as said control signal varies over a first predetermined range of values extending from said first limit to a preselected first intermediate value of said control signal, the firing signals of said second set being nominally generated at an ignition angle ($\alpha_2$) that varies from fully retarded to fully advanced as said control signal varies over a second predetermined range of values extending from approximately said first intermediate value to a preselected second intermediate value outside of said first range, and the firing signals of said third set being nominally generated at an ignition angle ($\alpha_3$) that varies from fully retarded to fully advanced as said control signal varies over a third predetermined range of values extending from approximately said second intermediate value to said second limit, said control means also being operative to control said valve turn off means so that normally the pair of main valves in said first rectifying circuit are periodically turned off in synchronism with the alternating voltage applied to the input terminals thereof at a desired extinction angle which varies within predetermined limits, wherein the improvement comprises logic means connected to said fault detecting means and to said control means and responsive to said speed feedback signal:

(a) for inhibiting said first set of firing signals in response to said first fault signal;
(b) for blocking valve turn off operation of said control means in response to said first fault signal;
(c) for inhibiting said second set of firing signals in response to said second fault signal or whenever there is no first fault signal and motor speed is lower than a predetermined threshold; and
(d) for inhibiting said third set of firing signals whenever none of said fault signals is being produced and motor speed is lower than another threshold which is higher than said predetermined threshold, or whenever said fault detecting means is producing either one but not both of said first and second fault signals and there is no third fault signal and motor speed is lower than said predetermined threshold, or when said fault detecting means is producing said third fault signal.

2. The improvement of claim 1 wherein said control means includes bias means for selecting said second intermediate value of said control signal and wherein said logic means is effective, when it is inhibiting said second set of firing signals, to cause said bias means to make said second intermediate value substantially the same as said first intermediate value, whereupon $\alpha_3$ will then be varied from fully retarded to fully advanced as said control signal varies over said second predetermined range.

3. The improvement of claim 2 wherein said control means includes clamping means effective whenever said logic means is blocking valve turn off operation of said control means for preventing $\alpha_3$ from becoming smaller than a predetermined minimum angle which is larger than approximately 50 electrical degrees.

4. The improvement of claim 1 wherein said control means includes clamping means effective whenever said logic means is blocking valve turn off operation of said control means for preventing $\alpha_1$ from becoming smaller than a predetermined minimum angle which is larger than approximately 50 electrical degrees.

5. The improvement of claim 1 wherein said logic means is effective to block valve turn off operation of said control means in response to either said first or said second fault signal.

* * * * *

UNITED STATES PATENT AND TRADEMARK OFFICE
CERTIFICATE OF CORRECTION

PATENT NO. : 4,454,455

DATED : June 12, 1984

INVENTOR(S) : Edward S. Matulevich and Robert E. Cronmiller

It is certified that error appears in the above-identified patent and that said Letters Patent is hereby corrected as shown below:

Front page: Change the heading "Matulevich" to -- Matulevich et al -- and on the line "[75] Inventor" add the name of co-inventor Robert E. Cronmiller, also of Erie, Pa.

Column 4, line 22, after "need" insert -- to be removed from --

Column 8, line 26, after "event" insert -- of a short --

Colum 13, line 10, before "F2" insert -- an overcurrent signal --

Column 20, line 39, before "logic" insert -- $\beta$ --

Signed and Sealed this

Ninth Day of October 1984

[SEAL]

Attest:

GERALD J. MOSSINGHOFF

Attesting Officer

Commissioner of Patents and Trademarks